US010082308B2

(12) United States Patent
Erickson et al.

(10) Patent No.: US 10,082,308 B2
(45) Date of Patent: Sep. 25, 2018

(54) THERMOSTAT WITH HEAT RISE COMPENSATION BASED ON WIRELESS DATA TRANSMISSION

(71) Applicant: Johnson Controls Technology Company, Plymouth, MI (US)

(72) Inventors: Christine R. Erickson, Milwaukee, WI (US); Michael J. Ajax, Milwaukee, WI (US); Christopher J. McCann, West Bend, WI (US); Daniel R. Hjortland, Milwaukee, WI (US); Justin J. Seifi, Cedarburg, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 15 days.

(21) Appl. No.: 15/287,677

(22) Filed: Oct. 6, 2016

(65) Prior Publication Data

US 2017/0023272 A1    Jan. 26, 2017

Related U.S. Application Data

(63) Continuation-in-part of application No. 15/008,318, filed on Jan. 27, 2016.
(Continued)

(51) Int. Cl.
*F24F 11/00* (2018.01)
*G06F 19/00* (2018.01)
(Continued)

(52) U.S. Cl.
CPC .......... *F24F 11/0012* (2013.01); *F24F 3/044* (2013.01); *F24F 11/30* (2018.01);
(Continued)

(58) Field of Classification Search
CPC ........ F24F 11/46; F24F 11/62; F24F 2110/00; F24F 2130/00; G01J 2005/068; G05D 23/1931
See application file for complete search history.

(56) References Cited

U.S. PATENT DOCUMENTS

| 4,741,476 A | 5/1988 | Russo et al. |
| 5,803,357 A | 9/1998 | Lakin |

(Continued)

FOREIGN PATENT DOCUMENTS

| CN | 101126536 | 2/2008 |
| CN | 203100067 | 1/2013 |

(Continued)

*Primary Examiner* — Ronald D Hartman, Jr.
(74) *Attorney, Agent, or Firm* — Foley & Lardner LLP

(57) ABSTRACT

A HVAC controller located within a building zone includes a housing, a wireless radio, a controller monitor, a temperature sensor, and a temperature compensation module. The wireless radio is contained within the housing and is configured to transmit data via a wireless HVAC network. The controller monitor is configured to detect wireless activity of the wireless radio, the wireless activity generating heat inside the housing and causing a temperature inside the housing to exceed a temperature of the building zone outside the housing. The temperature sensor is configured to measure the temperature inside the housing. The temperature compensation module is configured to determine a wireless heat rise resulting from the wireless activity, to calculate a temperature offset based on the wireless heat rise, and to determine the temperature of the building zone outside the housing by subtracting the temperature offset from the temperature measured inside the housing.

21 Claims, 10 Drawing Sheets

Related U.S. Application Data

(60) Provisional application No. 62/113,053, filed on Feb. 6, 2015.

(51) Int. Cl.

| | | |
|---|---|---|
| *G05B 15/02* | (2006.01) |
| *F24F 11/30* | (2018.01) |
| *G05D 23/32* | (2006.01) |
| *H04L 12/28* | (2006.01) |
| *G05B 19/042* | (2006.01) |
| *F24F 3/044* | (2006.01) |
| *F24F 11/62* | (2018.01) |
| *F24F 110/10* | (2018.01) |
| *F24F 110/12* | (2018.01) |
| *F24F 110/20* | (2018.01) |
| *F24F 110/22* | (2018.01) |
| *F24F 11/58* | (2018.01) |

(52) U.S. Cl.
CPC .............. *F24F 11/62* (2018.01); *G05B 15/02* (2013.01); *G05B 19/0428* (2013.01); *G05D 23/32* (2013.01); *H04L 12/2816* (2013.01); *F24F 11/58* (2018.01); *F24F 2110/10* (2018.01); *F24F 2110/12* (2018.01); *F24F 2110/20* (2018.01); *F24F 2110/22* (2018.01); *G05B 2219/25187* (2013.01); *G05B 2219/2614* (2013.01); *Y02B 30/767* (2013.01)

(56) References Cited

U.S. PATENT DOCUMENTS

| | | | |
|---|---|---|---|
| 5,973,542 A | 10/1999 | Okayasu et al. |
| 7,364,353 B2 | 4/2008 | Kolk |
| 7,784,705 B2 | 8/2010 | Kasper et al. |
| 8,267,578 B2 | 9/2012 | Kamata |
| 8,280,673 B2 | 10/2012 | Aljabari |
| 8,558,179 B2 | 10/2013 | Filson et al. |
| 8,766,194 B2 | 7/2014 | Filson et al. |
| 8,949,066 B2 | 2/2015 | Aljabari |
| 8,954,288 B2 | 2/2015 | Aljabari |
| 8,961,005 B2 | 2/2015 | Huppi et al. |
| 9,016,593 B2 | 4/2015 | Metselaar |
| 9,134,184 B2 | 9/2015 | Kamata |
| 9,234,669 B2 | 1/2016 | Filson et al. |
| 9,326,323 B2 | 4/2016 | Aljabari |
| 9,335,769 B2 | 5/2016 | Aljabari et al. |
| 9,345,066 B2 | 5/2016 | Aljabari |
| 9,360,229 B2 * | 6/2016 | Modi ................... F24F 11/0086 |
| 9,671,296 B2 | 6/2017 | Niederberger et al. |
| 2005/0043907 A1 | 2/2005 | Eckel et al. |
| 2005/0209813 A1 | 9/2005 | Kautz et al. |
| 2011/0191059 A1 | 8/2011 | Farrell et al. |
| 2012/0051394 A1* | 3/2012 | Wang ......................... G01J 5/22 374/102 |
| 2013/0204442 A1 | 8/2013 | Modi et al. |
| 2014/0324232 A1* | 10/2014 | Modi ................... F24F 11/0086 700/278 |
| 2015/0300892 A1* | 10/2015 | Malhotra ............... G01K 13/00 700/276 |
| 2016/0212799 A1 | 7/2016 | Aljabari |
| 2016/0252268 A1 | 9/2016 | Aljabari et al. |
| 2016/0265800 A1* | 9/2016 | Modi ................... F24F 11/0086 |
| 2016/0356515 A1 | 12/2016 | Carter |
| 2017/0051933 A1 | 2/2017 | Verhoeven et al. |
| 2017/0059190 A1* | 3/2017 | Stefanski ............... G05B 15/02 |
| 2017/0059413 A1* | 3/2017 | Honjo ................... G01J 5/0025 |

FOREIGN PATENT DOCUMENTS

| | | |
|---|---|---|
| JP | 2008-014512 | 7/2013 |
| WO | WO-01/69341 | 9/2001 |

\* cited by examiner

THERMOSTAT WITH HEAT RISE COMPENSATION BASED ON WIRELESS DATA TRANSMISSION

CROSS-REFERENCE TO RELATED PATENT APPLICATION

This application is a continuation-in-part of U.S. patent application Ser. No. 15/008,318 filed Jan. 27, 2016, the entirety of which is incorporated by reference herein.

BACKGROUND

The present disclosure relates generally to electronic controllers that include an integrated temperature sensor. More specifically, the present disclosure relates to a controller in a heating, ventilating and air conditioning (HVAC) system that compensates for the heat generated by electronic components within the controller which affect the temperature measured by the integrated temperature sensor.

Electronic components within a zone controller (e.g., a wall-mounted thermostat) can generate heat during operation. The heat generated within the zone controller may cause the temperature within the zone controller to be higher than the actual ambient temperature of the building zone in which the controller is located. This temperature difference can adversely affect the performance of the building HVAC system if left uncorrected. For example, a feedback control system using the measured temperature as a feedback signal may heat or cool the building zone until the measured temperature reaches a temperature set point. Since the actual temperature of the building zone is cooler than the measured temperature, controlling the measured temperature to the set point can cause the actual temperature of the building zone to be cooler than the set point.

Previous techniques for compensating for the heat generated within a controller use the time that the controller (as a whole) has been powered on as the basis for internal heat generation. For example, U.S. Pat. No. 7,784,705 ("the '705 patent") describes a temperature compensation method which calculates a corrected temperature as a function of the time since the controller was most recently powered up. The temperature compensation techniques described in the '705 patent assume that the controller generates heat at a constant rate when it is powered, regardless of how the controller is being used and independent of the control outputs provided by the controller.

The inventors of the present invention have recognized that the temperature compensation techniques described in the '705 patent fail to account for variable levels of internal heat generation within the controller and do not provide the granularity or adaptability to accurately model internal heat generation based on which components of the controller are currently active. It would be desirable to develop a temperature compensation technique that overcomes these and other disadvantages of the '705 patent.

SUMMARY

One implementation of the present disclosure is a HVAC controller located within a building zone. The controller includes a housing, a wireless radio, a controller monitor, a temperature sensor, and a temperature compensation module. The wireless radio is contained within the housing and is configured to transmit data via a wireless HVAC network. The controller monitor is configured to detect wireless activity of the wireless radio, the wireless activity generating heat inside the housing and causing a temperature inside the housing to exceed a temperature of the building zone outside the housing. The temperature sensor is configured to measure the temperature inside the housing. The temperature compensation module is configured to determine a wireless heat rise resulting from the wireless activity, to calculate a temperature offset based on the wireless heat rise, and to determine the temperature of the building zone outside the housing by subtracting the temperature offset from the temperature measured inside the housing.

In some embodiments, the wireless radio causes the temperature inside the housing to exceed the temperature of the building zone outside the housing by generating heat as a result of wirelessly communicating through a mesh topology to at least one of a Zigbee coordinator and a Zigbee router.

In some embodiments, the controller monitor is further configured to generate an actual wireless data value representing an actual amount of wireless data transmitted by the wireless radio over a time period. In some embodiments, the temperature compensation module is configured to determine the wireless heat rise as a function of the actual wireless data value.

In some embodiments, the temperature compensation module determines the wireless heat rise resulting from the wireless activity by identifying a maximum wireless data value representing a maximum amount of wireless data capable of being transmitted by the wireless radio over the time period, dividing the actual wireless data value by the maximum wireless data value to determine a scaled heat rise generated by the wireless radio over a time period, and multiplying the scaled heat rise by a wireless gain to determine the wireless heat rise.

In some embodiments, the controller monitor is configured to generate the maximum wireless data value by identifying a preset firmware value for maximum wireless data, receiving a value for maximum wireless data from a user setting, receiving a value for maximum wireless data from the wireless HVAC network, and calculating a value for maximum wireless data from at least one of a wireless protocol type, a modulation scheme, and a transmission frequency band.

In some embodiments, the temperature compensation module is configured to calculate the temperature offset as a function of both a wireless offset and the wireless heat rise resulting from the wireless activity. The wireless offset may represent a baseline amount of heat generated by the wireless radio independent from the wireless heat rise resulting from the wireless activity.

In some embodiments, the temperature compensation module includes a temperature compensation filter that uses a first order low pass transfer function to calculate the temperature offset. The temperature compensation module may be further configured to generate an input for the temperature compensation filter by summing at least the wireless offset and the wireless heat rise resulting from the wireless activity.

In some embodiments, the temperature compensation filter is a discrete-time digital filter that outputs the temperature offset as a function of a previous temperature offset and the wireless heat rise resulting from the wireless activity. The wireless heat rise may occur after the previous temperature offset is calculated.

In some embodiments, the temperature compensation module is further configured to store the temperature offset upon powering off the controller and use the stored temperature offset as the previous temperature offset in the temperature compensation filter when the controller is powered on.

In some embodiments, upon powering on the controller, the temperature compensation module is configured to determine whether the controller has been powered off for a time period exceeding a threshold, use the stored temperature offset as the previous temperature offset in the temperature compensation filter if the controller has been powered off for a time period that does not exceed the threshold, and reset the previous temperature offset to zero if the controller has been powered off for a time period that exceeds the threshold.

One implementation of the present disclosure is a controller for a HVAC system. The controller includes a communications interface, a controller monitor and a temperature compensation module. The communications interface receives, from an electronic device located within a building zone, a temperature measured within a housing of the electronic device. The controller monitor is configured to detect wireless activity of a wireless radio inside the housing of the electronic device, the wireless activity generating heat inside the housing and causing the temperature inside the housing to exceed a temperature of the building zone outside the housing. The temperature compensation module is configured to determine a wireless heat rise resulting from the wireless activity, to calculate a temperature offset from the wireless heat rise and a wireless offset, and to determine the temperature of the building zone outside the housing by subtracting the temperature offset from the temperature measured inside the housing.

In some embodiments, the wireless radio causes the temperature inside the housing to exceed the temperature of the building zone outside the housing by generating heat as a result of wirelessly communicating through a mesh topology to at least one of a Zigbee coordinator and a Zigbee router.

In some embodiments, the controller monitor is further configured to generate an actual wireless data value representing an actual amount of wireless data transmitted by the wireless radio over a time period. The temperature compensation module may be configured to determine the wireless heat rise as a function of the actual wireless data value.

In some embodiments, the temperature compensation module determines the wireless heat rise resulting from the wireless activity by identifying a maximum wireless data value representing a maximum amount of wireless data capable of being transmitted by the wireless radio over the time period, dividing the actual wireless data value by the maximum wireless data value to determine a scaled heat rise generated by the wireless radio over a time period, and multiplying the scaled heat rise by a wireless gain to determine the wireless heat rise.

In some embodiments, the temperature compensation module is configured to calculate the temperature offset as a function of both a wireless offset and the wireless heat rise resulting from the wireless activity. The wireless offset may represent a baseline amount of heat generated by the wireless radio independent from the wireless heat rise resulting from the wireless activity.

In some embodiments, the temperature compensation module includes a temperature compensation filter that uses a first order low pass transfer function to calculate the temperature offset. The temperature compensation module may be further configured to generate an input for the temperature compensation filter by summing at least the wireless offset and the wireless heat rise resulting from the wireless activity.

Another implementation of the present disclosure is a HVAC controller located within a building zone. The controller includes a housing, a wireless radio, a humidity sensor, a temperature sensor, and a humidity compensation module. The wireless radio is contained within the housing and is configured to transmit data via a wireless HVAC network. The humidity sensor is configured to measure the relative humidity of the building zone inside the housing. The temperature sensor is configured to measure a temperature of the building zone inside the housing. The humidity compensation module is configured to calculate a dew point of the building zone inside the housing using the relative humidity measured inside the housing and the temperature measured inside the housing. The humidity compensation module is configured to determine a relative humidity of the building zone outside the housing using a temperature of the building zone outside the housing and the calculated dew point.

In some embodiments, the HVAC controller further includes a controller monitor and a temperature compensation module. The controller monitor may be configured to detect wireless activity of the wireless radio, the wireless activity generating heat inside the housing and causing a temperature inside the housing to exceed the temperature of the building zone outside the housing. The temperature compensation module may be configured to determine a wireless heat rise resulting from the wireless activity, to calculate a temperature offset based on the wireless heat rise, and to determine the temperature of the building zone outside the housing by subtracting the temperature offset from the temperature measured inside the housing.

In some embodiments, the temperature compensation module is configured to calculate the temperature offset as a function of both a wireless offset and the wireless heat rise resulting from the wireless activity. The wireless offset may represent a baseline amount of heat generated by the wireless radio independent from the wireless heat rise resulting from the wireless activity.

In some embodiments, the temperature compensation module includes a temperature compensation filter that uses a first order low pass transfer function to calculate the temperature offset. In some embodiments, the temperature compensation module is further configured to generate an input for the temperature compensation filter by summing at least the wireless offset and the wireless heat rise resulting from the wireless activity.

DETAILED DESCRIPTION

Figure 1:
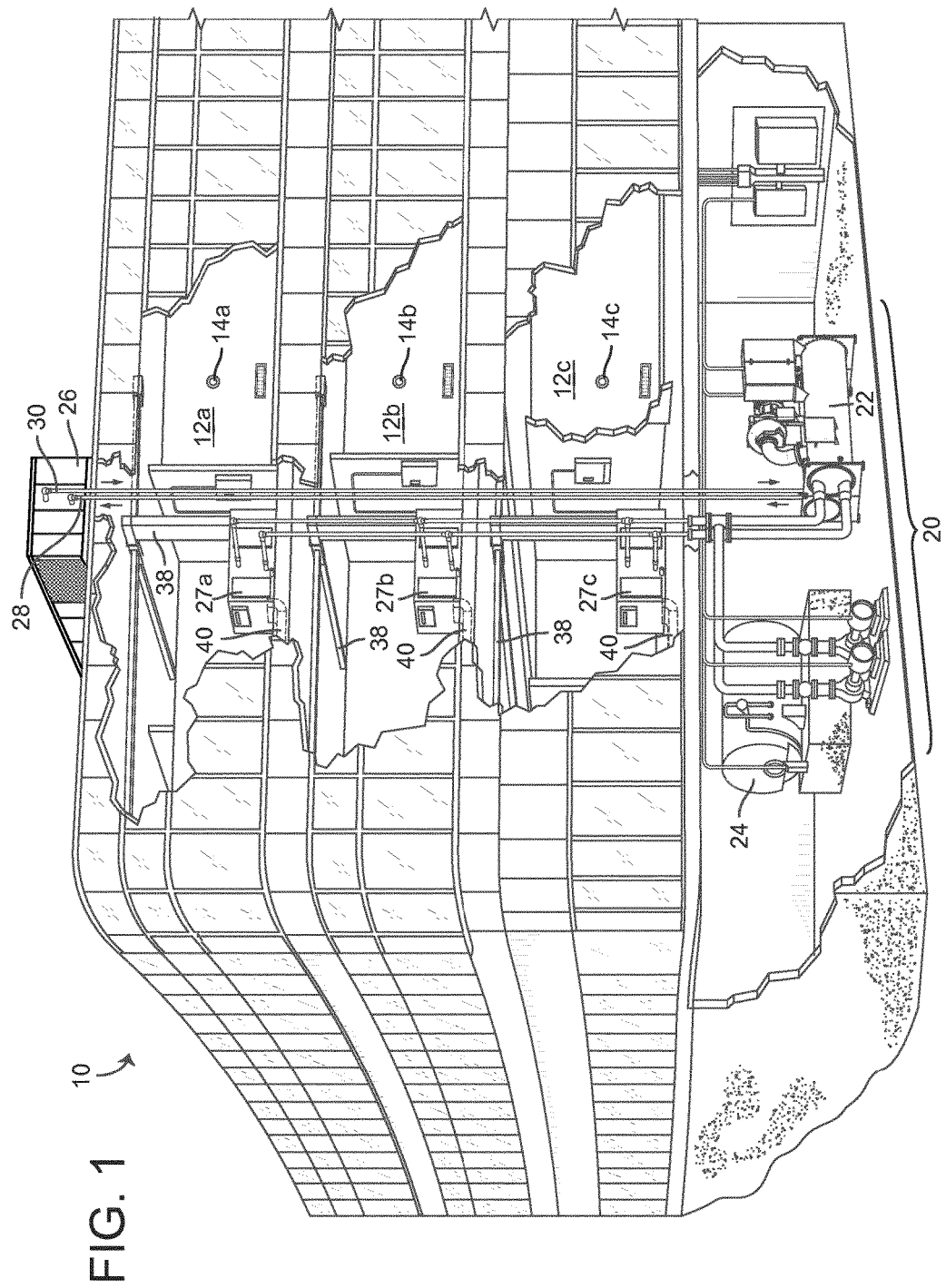
FIG. 1 is a drawing of a building equipped with a HVAC system and including zone controllers in each of the building zones, according to an exemplary embodiment.

Referring generally to the FIGURES, systems and methods for heat rise compensation are shown, according to various exemplary embodiments. The systems and methods described herein may be used to compensate for the heat generated within a housing of an electronic device which causes the temperature measured by the electronic device to be greater than the actual ambient temperature of the space in which the electronic device is located. For example, the heat compensation techniques can be used in an electronic controller that includes one or more temperature sensors which can be affected by the internal heating of components within the electronic controller. Such electronic controllers can be used to control a variety of systems (e.g., HVAC systems, security systems, elevator systems, lighting systems, water systems, etc.).

Some embodiments generally relate to systems and methods for automatically compensating for the heat generated by an electronic controller in a HVAC system. A zone controller is used as an example in the various figures. However, it should be recognized that the pre systems and methods for automatically compensating for the heat can be applied to a wide variety of electronic controllers and other electronic devices that include an integrated temperature sensor within a housing of the device.

In some embodiments, a building HVAC system includes a zone controller (e.g., a wall-mounted thermostat and/or humidistat) configured to monitor and control the environmental conditions within a zone of the building. The electronic components of the zone controller generate heat during operation. The heat generated within the zone controller may cause the temperature within the zone controller to be higher than the actual ambient temperatures of the building zone. This temperature difference can adversely affect the performance of the building HVAC system if left uncorrected. For example, a feedback control system using the measured temperature as a feedback signal may heat or cool the building zone until the measured temperature reaches a temperature set point. Since the actual temperature of the building zone is cooler than the measured temperature, controlling the measured temperature to the set point can cause the actual temperature of the building zone to be cooler than the set point.

Some embodiments provide an event-driven heat rise compensation routine that includes identifying one or more heat-generating components within the HVAC controller and detecting controller events associated with the heat-generating components. Heat-generating components may include, for example, a power supply, an LCD display, a backlight for the LCD display, control outputs such as relays and triacs, a processor, and/or any other component that generates heat within the HVAC controller when the component is used. Controller events associated with the heat-generating components may include, for example, activating the LCD display, illuminating the backlight, providing control outputs via the relays and triacs, activating the power supply, using the processor, and/or any other action or event that generates heat within the HVAC controller.

Each of the detected controller events may be associated with a steady-state temperature gain. For example, the steady-state temperature gains may include a temperature gain associated with activating the LCD display, a temperature gain associated with illuminating the backlight at full brightness or any of the intermediate brightness levels, a temperature gain associated with activating each of the relays and triacs, and/or any other temperature gains that correspond to any of the detectable controller events. Each temperature gain may correspond to a temperature increase resulting from the associated controller event. The HVAC controller may calculate a temperature offset using a summation of the temperature gains associated with the detected controller events. In some embodiments, calculating the temperature offset includes using a first order low pass filter. The summation of the temperature gains may be provided as an input to the filter and used to determine the temperature offset resulting from the detected controller events.

Advantageously, some embodiments of the event-driven compensation routine described herein allows each controller event to be independently included or not included in the in the heat rise calculation based on whether the controller event is detected. Using controller events in this manner advantageously allows the HVAC controller to calculate the temperature offset with greater granularity and accuracy relative to traditional heat rise calculations that only consider the amount of time since the controller (as a whole) was powered on.

Referring now to FIG. 1, a perspective view of a building 10 is shown. Building 10 is serviced by HVAC system 20. HVAC system 20 is shown to include a chiller 22, a boiler 24, and a rooftop air handling unit (AHU) 26. HVAC system 20 uses a fluid circulation system to provide heating and/or cooling for building 10. The circulated fluid (e.g., water, glycol, etc.) may be cooled in chiller 22 or heated in boiler 24, depending on whether cooling or heating is required. Boiler 24 may add heat to the circulated fluid, for example, by burning a combustible material (e.g., natural gas). Chiller 22 may place the circulated fluid in a heat exchange relationship with another fluid (e.g., a refrigerant) in a heat exchanger (e.g., an evaporator) to absorb heat from the circulated fluid. The circulated fluid from chiller 22 or boiler 24 may be transported to AHU 26 via piping 28. AHU 26 may place the circulated fluid in a heat exchange relationship with an airflow passing through AHU 26 (e.g., via one or more stages of cooling coils and/or heating coils). The airflow may be outside air, return air from within building 10, or a combination of both. AHU 26 may transfer heat between the airflow and the circulated fluid to provide heating or cooling for the airflow. For example, AHU 26 may include one or more fans or blowers configured to pass the airflow over or through a heat exchanger containing the circulated fluid. The circulated fluid may then return to chiller 22 or boiler 24 via piping 30.

The airflow supplied by AHU 26 (i.e., the supply airflow) can be delivered to building 10 via an air distribution system including air supply ducts 38 and may return to AHU 26 from building 10 via air return ducts 40. In some embodiments, building 10 includes a number (e.g., two or more) variable air volume (VAV) units 27a-27c. For example, HVAC system 20 is shown to include a first VAV unit 27a in a first zone 12a of building 10, a second VAV unit 27b in a second zone 12b of building 10, and a third VAV unit 27c in a third zone 12c of building 10. VAV units 27a-27c may include dampers or other flow control elements which can be operated to control an amount of the supply airflow provided to each of building zones 12a-12c, respectively. In other embodiments, AHU 26 delivers the supply airflow into building zones 12a-12c (e.g., via supply ducts 38) without requiring intermediate flow control elements. In FIG. 1, building 10 is shown to include three building zones 12a-12c; however, it should be understood that building 10 may include any number of discrete or interconnected zones in various other implementations.

AHU 26 may include one or more sensors (e.g., temperature sensors, pressure sensors, humidity sensors, etc.) configured to measure attributes of the supply airflow. In some embodiments, AHU 26 includes one or more humidity control devices (e.g., humidifiers, dehumidifiers, desiccant wheels, etc.) configured to control a humidity level of the supply airflow. The humidity control devices may add or remove humidity to the supply airflow to achieve set point humidity conditions within building zones 12a-12c.

AHU 26 may receive input from sensors and/or zone controllers 14a-14c located within building zones 12a-12c For example, HVAC system 20 is shown to include a first zone controller 14a located within building zone 12a, a second zone controller 14b located within building zone 12b, and a third zone controller 14c located within building zone. In some embodiments, zone controllers 14a-14c are wall-mounted control units configured to measure and/or control a variable state or condition (e.g., temperature, humidity, air pressure, etc.) within building zones 12a-12c. For example, zone controllers 14a-14c may be wall-mounted thermostats and/or humidistats configured to measure and control the temperature and/or humidity of building zones 12a-12c. HVAC system 20 may adjust the flow rate, temperature, humidity, or other attributes of the supply airflow through AHU 26 to achieve the set point conditions for building zones 12a-12c.

Zone controllers 14a-14c may include a housing containing various electronic devices. For example, zone controllers 14a-14c may include integrated sensors (e.g., temperature sensors, humidity sensors, lighting sensors, etc.) for monitoring environmental conditions within building zones 12a-12c. Zone controllers 14a-14c may include communications electronics configured to facilitate electronic data communications with various other components of HVAC system 20 (e.g., an AHU controller, a supervisory controller, etc.). In some embodiments, zone controllers 14a-14c include a user interface (e.g., an LCD display, a control panel, etc.) configured to facilitate communications between zone controllers 14a-14c and a user. For example, the user interface may display current environmental conditions within the building zone via an electronic display (e.g., a graphical display, an alpha-numeric display, etc.) and may include a user input device (e.g., a keypad, buttons, a touch-sensitive display, etc.) for receiving user input. A user may interact with zone controllers 14a-14c via the user interface to view or adjust the control set points for building zones 12a-12c.

The electronic components of zone controllers 14a-14c can generate heat during operation. For example, heat may be generated internally within zone controllers 14a-14c by an internal power supply, a CPU, an electronic display, and/or control outputs such as relays and triacs turning on/off. The heat generated within zone controllers 14a-14c can cause the temperatures within zone controllers 14a-14c to be higher than the actual ambient temperatures of building zones 12a-12c. This temperature difference can adversely affect the performance of HVAC system 20 if left uncorrected. For example, an integrated temperature sensor within one of zone controllers 14a-14c can measure a temperature that is higher than the actual temperature of the corresponding building zone. A feedback control system using the measured temperature as a feedback signal can heat or cool the building zone until the measured temperature reaches a temperature set point. Since the actual temperature of the building zone is cooler than the measured temperature, controlling the measured temperature to the set point can cause the actual temperature of the building zone to be cooler than the set point. Advantageously, zone controllers 14a-14c can be configured to compensate for such internal heat generation, as described in greater detail with reference to FIG. 3.

Figure 2:
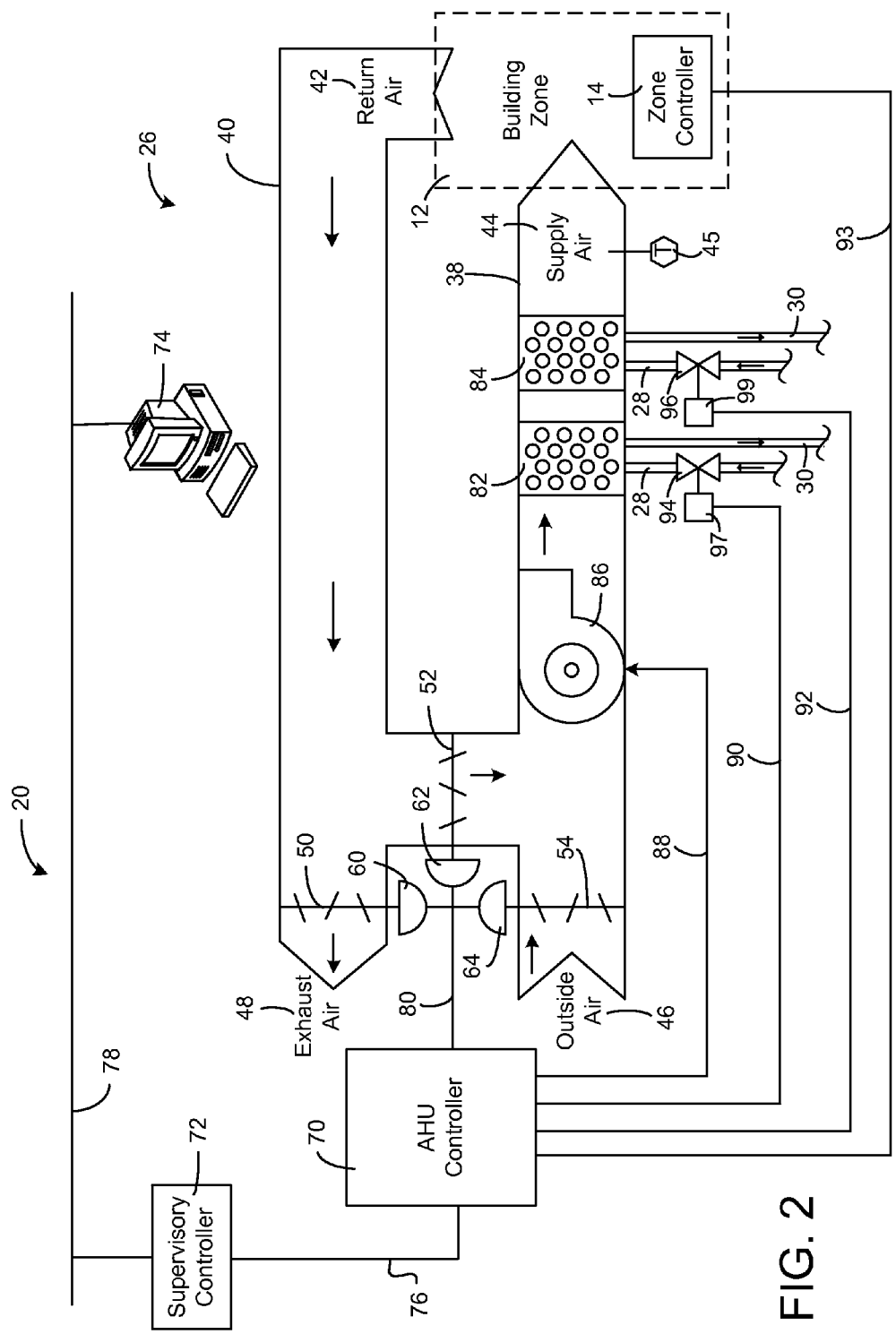
FIG. 2 is a block diagram illustrating a portion of the HVAC system of FIG. 1 in greater detail, according to an exemplary embodiment.

Referring now to FIG. 2, a block diagram illustrating AHU 26 in greater detail is shown, according to an exemplary embodiment. AHU 26 is shown as an economizer-type air handling unit. Economizer-type air handling units vary the amount of outside air and return air used by the air handling unit for heating or cooling. For example, AHU 26 may receive return air 42 from building zone 12 (e.g., one of building zones 12a-12c) via return air duct 40 and may deliver supply air 44 to building zone 12 via supply air duct 38. In some embodiments, AHU 26 is a rooftop unit and may be located on the roof of building 10 (e.g., as shown in FIG. 1) or otherwise positioned to receive return air 42 and outside air 46. AHU 26 may be configured to operate exhaust air damper 50, mixing damper 52, and outside air damper 54 to control an amount of outside air 46 and return air 42 that combine to form supply air 44. Any return air 42 that does not pass through mixing damper 52 may be exhausted from AHU 26 through exhaust damper 50 as exhaust air 48.

Each of dampers 50-54 may be operated by an actuator. As shown in FIG. 2, exhaust air damper 50 is operated by actuator 60, mixing damper 52 is operated by actuator 62, and outside air damper 54 is operated by actuator 64. Actuators 60-64 may communicate with an AHU controller 70 via a communications link 80. Actuators 60-64 may receive control signals from AHU controller 70 and may provide feedback signals to AHU controller 70. Feedback signals may include, for example, an indication of a current actuator or damper position, an amount of torque or force exerted by the actuator, diagnostic information (e.g., results of diagnostic tests performed by actuators 60-64), status information, commissioning information, configuration settings, calibration data, and/or other types of information or data that may be collected, stored, or used by actuators 60-64. AHU controller 70 may be an economizer controller configured to use one or more control algorithms (e.g., state-based algorithms, extremum-seeking control algorithms, PID control algorithms, model predictive control algorithms, feedback control algorithms, etc.) to control actuators 60-64.

Still referring to FIG. 2, AHU 26 is shown to include a cooling coil 82, a heating coil 84, and a fan 86 positioned within supply air duct 38. In some embodiments, AHU 26 also includes one or more humidity control devices (e.g., humidifiers, dehumidifiers, desiccant wheels, etc.) positioned within supply air duct 38. Fan 86 may be configured to force supply air 44 through cooling coil 82, heating coil 84, and/or the humidity control devices and provide supply air 44 to building zone 12. AHU controller 70 may communicate with fan 86 via communications link 88 to control a flow rate of supply air 44. In some embodiments, AHU controller 70 controls an amount of heating or cooling applied to supply air 44 by modulating a speed of fan 86. Cooling coil 82 may receive a chilled fluid from chiller 22 via piping 28 and may return the chilled fluid to chiller 22 via piping 30. Valve 94 may be positioned along piping 28 or piping 30 to control an amount of the chilled fluid provided to cooling coil 82. In some embodiments, cooling coil 82 includes multiple stages of cooling coils that can be independently activated and deactivated (e.g., by AHU controller 70) to modulate an amount of cooling applied to supply air 44. Heating coil 84 may receive a heated fluid from boiler 24 via piping 28 and may return the heated fluid to boiler 24 via piping 30. Valve 96 may be positioned along piping 28 or piping 30 to control an amount of the heated fluid provided to heating coil 84. In some embodiments, heating coil 84 includes multiple stages of heating coils that can be independently activated and deactivated to modulate an amount of heating applied to supply air 44.

Each of valves 94-96 may be controlled by an actuator. In the embodiment shown in FIG. 2, valve 94 is controlled by actuator 97 and valve 96 is controlled by actuator 99. Actuators 97-99 may communicate with AHU controller 70 via communications links 90-92. Actuators 97-99 may receive control signals from AHU controller 70 and may provide feedback signals to controller 70. AHU controller 70 may receive a measurement of the supply air temperature from a temperature sensor 45 positioned in supply air duct 38 (e.g., downstream of cooling coil 82 and/or heating coil 84). In some embodiments, AHU controller 70 also receives a measurement of the supply air humidity from a humidity sensor positioned in supply air duct 38.

In some embodiments, AHU controller 70 operates valves 94-96 via actuators 97-99 to modulate an amount of heating or cooling provided to supply air 44 (e.g., to achieve a set point temperature for supply air 44 or to maintain the temperature of supply air 102 within a set point temperature range). The positions of valves 97-99 affect the amount of heating or cooling provided to supply air 44 by cooling coil 82 or heating coil 84 and may correlate with the amount of energy consumed to achieve a desired supply air temperature. AHU 70 may control the temperature of supply air 44 and/or building zone 12 by activating or deactivating coils 82-84, adjusting a speed of fan 86, or a combination of both.

AHU controller 70 may communicate with a zone controller 14 (e.g., one of zone controllers 14a-14c) located within building zone 12 via a communications link 93. Zone controller 14 may include an integrated temperature sensor, humidity sensor, lighting sensor, pressure sensor, and/or any other type of sensor configured to measure a variable state or condition (e.g., temperature, humidity, air pressure, lighting, etc.) within building zone 12. Advantageously, zone controller 14 may be configured to compensate for an internal heat generation within zone controller 14 and may adjust the measured temperature accordingly (e.g., by subtracting a calculated temperature offset from the measured temperature). The temperature adjustment performed by zone controller 14 is described in greater detail with reference to FIG. 3. Zone controller 14 may use the adjusted zone temperature in conjunction with an input from an integrated humidity sensor to calculate an adjusted relative humidity for building zone 12.

Zone controller 14 may include a user interface through which a user can view and/or adjust various control set points for building zone 12 (e.g., a temperature set point, a humidity set point, etc.). Zone controller 14 may use any of a variety of control algorithms (e.g., state-based algorithms, extremum-seeking control algorithms, PID control algorithms, model predictive control algorithms, feedback control algorithms, etc.) to determine appropriate control outputs for the controllable devices of HVAC system 20 (e.g., chiller 22, boiler 24, valves 94-96, actuators 60-64, actuators 97-99, cooling coil 82, heating coil 84, etc.) as a function of the adjusted zone conditions and/or the control set points. In other embodiments, zone controller 14 reports the adjusted zone conditions and the control set points to AHU controller 70 and AHU control 70 determines the appropriate control outputs for the controllable devices of HVAC system 20. In various embodiments, AHU controller 70 and zone controller 14 may be separate (as shown in FIG. 2) or integrated (e.g., for single-zone implementations such as a household thermostat). In an integrated implementation, AHU controller 70 may be a software module configured for execution by a processor of zone controller 14.

Still referring to FIG. 2, HVAC system 20 is shown to include a supervisory controller 72 and a client device 74. Supervisory controller 72 may include one or more computer systems (e.g., servers, BAS controllers, etc.) that serve as system level controllers, application or data servers, head nodes, master controllers, or field controllers for HVAC system 20. Supervisory controller 72 may communicate with multiple downstream building systems or subsystems (e.g., an HVAC system, a security system, etc.) via a communications link 76 according to like or disparate protocols (e.g., LON, BACnet, etc.). In some embodiments, the supervisory controller 72 may communicate via wireless protocols such as WiFi, Zigbee, Bluetooth, a cellular protocol (4G, 3G, 2G, etc.) or any other wireless protocol.

In some embodiments, AHU controller 70 receives information (e.g., commands, set points, operating boundaries, etc.) from supervisory controller 72. For example, supervisory controller 72 may provide AHU controller 70 with a high fan speed limit and a low fan speed limit. A low limit may avoid frequent component and power taxing fan start-ups while a high limit may avoid operation near the mechanical or thermal limits of the fan system. In various embodiments, AHU controller 70 and supervisory controller 72 may be separate (as shown in FIG. 2) or integrated. In an integrated implementation, AHU controller 70 may be a software module configured for execution by a processor of supervisory controller 72.

Client device 74 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 20, its subsystems, and/or devices. Client device 74 may be a computer workstation, a client terminal, a remote or local interface, or any other type of user interface device. Client device 74 may be a stationary terminal or a mobile device. For example, client device 74 may be a desktop computer, a computer server with a user interface, a laptop computer, a tablet, a smartphone, a PDA, or any other type of mobile or non-mobile device. Client device 74 may communicate with supervisory controller 72, AHU controller 70, and/or zone controller 14 via communications link 78.

Figure 3:
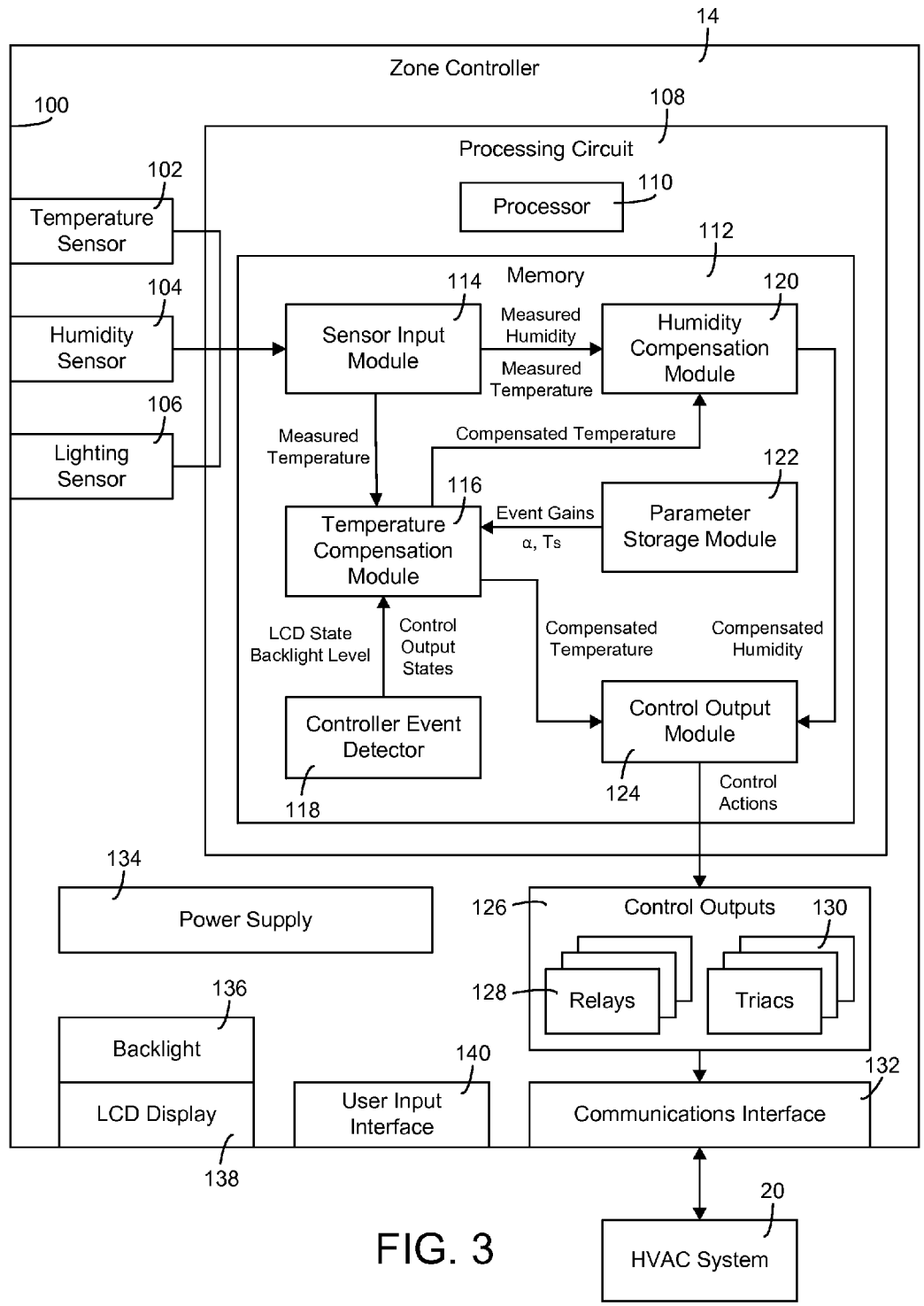
FIG. 3 is a block diagram illustrating one of the zone controllers of FIG. 1 in greater detail, according to an exemplary embodiment.

Referring now to FIG. 3, a block diagram illustrating zone controller 14 in greater detail is shown, according to an exemplary embodiment. Zone controller 14 may be located within building zone 12 and may be configured to measure one or more variable states or conditions (i.e., environmental conditions) within building zone 12. For example, zone controller 14 is shown to include a temperature sensor 102, a humidity sensor 104, and a lighting sensor 106 respectively configured to measure temperature, relative humidity, and lighting. Zone controller 14 can process the inputs provided by sensors 102-106 to determine appropriate control actions for HVAC system 20. For example, zone controller 14 can determine whether to activate or deactivate fan 86, cooling coil 82, heating coil 84, and/or other devices of HVAC system 20 (e.g., actuators, valves, etc.) that can be operated to affect the variable states or conditions measured by sensors 102-106. Zone controller 14 can generate control signals for HVAC system 20 based on the determined control actions and can output the generated control signals to HVAC system 20 via communications interface 132.

Zone controller 14 is shown to include a variety of electronic components contained within a housing 100. For example, zone controller 14 is shown to include several sensors (i.e., temperature sensor 102, humidity sensor 104, lighting sensor 106), a processing circuit 108, control outputs 126, a power supply 134, a communications interface 132, and user interface components (e.g., an LCD display 136, a backlight 136 for LCD display 138, and a user input interface 140). In various embodiments, power supply 134 can be an internal power supply (e.g., batteries) or an interface for receiving power from an external power source. LCD display 138 can be an electronic display (e.g., a graphical display, an alpha-numeric display, etc.) configured to present information to a user. LCD display 138 may be used to display, for example, the current environmental conditions within building zone 12 and/or the controller set points. Backlight 136 can provide backlighting for LCD display 138 and may be illuminated at various levels of brightness. User input interface 140 can include any of a variety of a user input devices (e.g., a keypad, buttons, a touch-sensitive display, etc.) for receiving user input. User input interface 140 can facilitate user interaction with zone controller 14 and can allow a user to adjust the controller set points.

Control outputs 126 are shown to include relays 128 and triacs 130. Control outputs 126 may be selectively activated or deactivated by processing circuit 108 (e.g., by control output module 124) to provide a control signal to communications interface 132. Communications interface 132 may include wired or wireless interfaces (e.g., jacks, antennas, transmitters, receivers, transceivers, wire terminals, etc.) for conducting electronic data communications with HVAC system 20 or other external systems or devices. Such communications can be direct (e.g., local wired or wireless communications) or via a communications network (e.g., a WAN, the Internet, a cellular network, etc.). For example, communications interface 132 can include an Ethernet card and port for sending and receiving data via an Ethernet-based communications link or network. In another example, communications interface 132 may include a WiFi transceiver or a cellular or mobile phone communications transceiver for communicating via a wireless communications network. Communications interface 132 can be communicably connected to processing circuit 108 such that processing circuit 108 and the various components thereof can send and receive data via communications interface 132.

Processing circuit 108 is shown to include a processor 110 and memory 112. Processor 110 can be implemented as a general purpose processor, an application specific integrated circuit (ASIC), one or more field programmable gate arrays (FPGAs), a group of processing components, or other suitable electronic processing components. Memory 112 (e.g., memory, memory unit, storage device, etc.) can include one or more devices (e.g., RAM, ROM, Flash memory, hard disk storage, etc.) for storing data and/or computer code for completing or facilitating the various processes, layers and modules described herein. Memory 112 can be or include volatile memory or non-volatile memory. Memory 112 can include database components, object code components, script components, or any other type of information structure for supporting the various activities and information structures described in the present application. According to an exemplary embodiment, memory 112 is communicably connected to processor 110 via processing circuit 108 and includes computer code for executing (e.g., by processing circuit 108 and/or processor 110) one or more processes described herein.

Some of components 102-140 may generate heat when they are used, which can cause the temperature within housing 100 (i.e., the temperature measured by temperature sensor 102) to be greater than the actual ambient temperature of building zone 12. The higher temperature within housing 100 may result in a lower relative humidity reading measured by humidity sensor 104 (relative to actual ambient conditions) due to the increased moisture capacity of the warmer air within housing 100.

Zone controller 14 can perform an event-driven compensation routine to automatically adjust the measured temperature and/or the measured relative humidity to more accurately reflect the actual ambient conditions within building zone 12 in some embodiments. The event-driven compensation routine includes detecting "controller events" (i.e., particular actions performed by zone controller 14) that generate heat within housing 100 in some embodiments. Controller events can include, for example, activating LCD display 138, illuminating backlight 136, providing control outputs via relays 128 and triacs 130, activating power supply 134, using processor 108, and/or any other action or event that generates heat within housing 100. Zone controller 14 can multiply each detected controller event by a steady state temperature gain associated with the controller event in some embodiments. Zone controller 14 can use a summation of the controller event products as an input to a temperature compensation filter in some embodiments. The temperature compensation filter (described in greater detail with reference to FIG. 4) outputs a temperature offset value, which can be subtracted from the temperature measured by temperature sensor 102 to determine the actual ambient temperature of building zone 12 in some embodiments.

Advantageously, the event-driven compensation routine allows zone controller 14 to determine a temperature offset based on the particular controller events that generate heat within housing 100. Each controller event can be independently included or not included in the event-driven compensation routine based on whether the controller event is detected. For example, the controller events may be a function of the brightness of backlight 136, whether LCD display is currently active, and/or whether a control signal is currently being provided to HVAC system 20 via control outputs 126 and communications interface 132. Using controller events in this manner advantageously allows zone controller 14 to calculate the temperature offset with greater granularity and accuracy relative to traditional heat rise calculations that only consider the amount of time since the controller (as a whole) was powered on.

Still referring to FIG. 3, memory 112 is shown to include a sensor input module 114 (i.e., a sensor input handler). Sensor input module 114 may receive and store inputs (i.e., data points) from temperature sensor 102, humidity sensor 104, lighting sensor 106, and/or any other sensor or measurement device. In some embodiments, sensor input module 114 converts the input data from each of sensors 102-106 into units that quantify the variable measured by the corresponding sensor. For example, temperature sensor 102 may be a thermistor or thermocouple that provides sensor input module 114 with a voltage representing a measured temperature. Sensor input module 114 may convert the voltage into units of temperature using a conversion chart or formula. Sensor input module 114 may perform a similar conversion procedure (if necessary) for the data from each of sensors 102-106.

In some embodiments, sensor input module 114 pre-filters the data (e.g., performs data scrubbing) to discard or format bad data in some embodiments. Sensor input module 114 can conduct one or more checks to determine whether the data is reliable, whether the data is in the correct format, whether the data is or includes a statistical outlier, whether the data is distorted or "not a number" (NaN), and/or whether the sensor or communication channel for a set of data has become stuck at some value in some embodiments. Sensor input module 114 can determine whether a data point should be discarded and may interpolate between data points to fill in missing or discarded data in some embodiments.

Sensor input module 114 can store the data points with attributes that describe the type of data (e.g., temperature, pressure, humidity, etc.), the unit of measure (e.g., degrees Fahrenheit, degrees Celsius, etc.), the data source (e.g., a particular sensor or building zone), a time at which the data point is measured, and/or other attributes that describe the data points or the physical state or condition represented by the data points in some embodiments. As shown in FIG. 3, sensor input module 114 may provide the data points (e.g., the measured temperature and the measured humidity) to temperature compensation module 116 and humidity compensation module 120 for use in the event-driven compensation routine.

Still referring to FIG. 3, memory 112 is shown to include a controller event detector 118 (i.e., an event detection module). Controller event detector can be configured to detect "controller events" within zone controller 14 in some embodiments. Controller events can include any event or action performed by zone controller 14 that generates heat within housing 100. For example, controller events can include activating or deactivating relays 128 or triacs 130, providing a control signal via communications interface 132, illuminating backlight 136, providing a display via LCD display 138, using power supply 134, or any other event or action that generates heat within housing 100.

In some embodiments, controller event detector 118 detects a state or condition of a heat-generating component of zone controller 14. For example, controller event detector 118 can determine whether each of relays 128 and triacs 130 is currently active or inactive (i.e., the control output states). Controller event detector 118 can determine whether LCD display 138 is currently providing a display and can determine whether backlight 136 is currently on or off in some embodiments. For embodiments in which backlight 136 can be illuminated at multiple brightness levels, controller event detector 118 may determine the backlight level (i.e., the brightness) of backlight 136. As shown in FIG. 3, controller event detector 118 may provide the detected controller events to temperature compensation module 116 for use in the event-driven compensation routine.

Still referring to FIG. 3, memory 112 is shown to include a parameter storage module 122 (i.e., a parameters database). Parameter storage module 122 may store various parameters used in the event-driven compensation routine. Parameters stored by parameter storage module 122 may include steady-state temperature gains (e.g., in units of ° F. or ° C.) associated with each of the detectable controller events. For example, parameter storage module 122 may store a temperature gain associated with activating LCD display 138 ("LCD Gain"), a temperature gain associated with illuminating backlight 136 at full brightness or any of the intermediate brightness levels ("Backlight Gain"), a temperature gain associated with activating each of relays 128 and triacs 130 ("Relay Gain"), and/or any other temperature gains that correspond to any of the detectable controller events. Parameter storage module 122 may store a sampling period parameter ("$T_s$") indicating a time between consecutive temperature measurements.

Parameter storage module 122 may store a correction factor α used in the event-driven compensation routine. The correction factor α may represent the heat rise within housing 100 resulting from any of the detectable controller events and may be a function of the thermal properties of zone controller 14 (e.g., thermal resistance, heat capacity, etc.). In various embodiments, the correction factor α and the temperature gains may be received from an external data source or determined empirically. For example, the correction factor α may be determined empirically by placing zone controller 14 into a controlled-temperature environment (e.g., a psychometric chamber), allowing the temperature measured by temperature sensor 102 to stabilize with backlight 136 turned off, stepping backlight 136 to full brightness, and measuring the increase in temperature caused by illuminating backlight 136. The same correction factor α may be used for each of the detectable controller events. Differences in the amount of heat generated by each controller event may be indicated by the temperature gains associated with each controller event. As shown in FIG. 3, parameter storage module 122 may provide the event gains, the sampling period parameter $T_s$ and the correction factor α to temperature compensation module 116 for use in the event-driven compensation routine.

Still referring to FIG. 3, memory 112 is shown to include a temperature compensation module 116 (i.e., a temperature compensator). Temperature compensation module 116 may perform an event-driven temperature compensation routine to calculate an error in the temperature measured by temperature sensor 102 (i.e., a temperature offset) resulting from the heat generated within housing 100. Temperature compensation module 116 may subtract the temperature offset from the measured temperature to determine a compensated temperature representing the actual ambient temperature of building zone 12.

Temperature compensation module 116 may receive the measured temperature from sensor input module 114, the detected controller events from controller event detector 118, and the event gains and other parameters from parameter storage module 122. Temperature compensation module 116 may multiply each of the detected controller events by the event gain associated with the controller event. Temperature compensation module 116 may sum the event gains associated with the detected controller events to calculate a heat rise resulting from the detected controller events.

In some embodiments, temperature compensation module 116 includes a temperature compensation filter. The temperature compensation filter may be a first order low pass filter which models the heat rise within housing 100 using a first order transfer function. Temperature compensation module 116 may provide the heat rise resulting from the detected controller events as an input to the temperature compensation filter. The temperature compensation filter may output the temperature offset as a function of the heat rise resulting from the detected controller events, the correction factor α, and the sampling period parameter $T_s$. The event-driven compensation routine and the temperature-compensation filter are described in greater detail with reference to FIG. 4.

Still referring to FIG. 3, memory 112 is shown to include a humidity compensation module 120 (i.e., a humidity compensator). Humidity compensation module 120 may receive the measured humidity from sensor input module 114. The measured humidity represents the relative humidity measured by humidity sensor 104, which is the relative humidity within housing 100. The air inside housing 100 and outside housing 100 may have the same moisture content; however, since the temperature within housing 100 is greater than the ambient temperature of building zone 12 outside housing 100, the measured relative humidity within housing 100 may be lower than the actual relative humidity of the air outside housing 100 due to the greater moisture capacity of warmer air.

Humidity compensation module 120 may be configured to perform a humidity compensation routine to calculate the relative humidity of the air in building zone 12 outside housing 100. The humidity compensation routine may include determining the dew point of the air within housing 100 as a function of the measured temperature and the measured relative humidity. Since the air inside housing 100 and the air outside housing 100 have the same moisture content, the dew point of the air outside housing 100 may be the same as the dew point of the air inside housing 100. Humidity compensation module 120 may receive the compensated temperature from temperature compensation module 116. The compensated temperature represents the actual temperature of the air outside housing 100. Advantageously, humidity compensation module 120 may use the compensated temperature and the dew point of the air outside housing 100 to calculate a compensated humidity representing the actual relative humidity of the air in building zone 12 outside housing 100. The humidity compensation routine is described in greater detail with reference to FIG. 5.

Still referring to FIG. 3, memory 112 is shown to include a control output module 124 (i.e., a control output handler). Control output module 124 is shown receiving the compensated temperature from temperature compensation module 116 and the compensated humidity from humidity compensation module 120. Control output module 124 may use the compensated temperature and the compensated humidity to determine appropriate control actions for HVAC system 20. In some embodiments, control output module 124 provides a control signal to HVAC system 20 via communications interface 132. Control output module 124 may activate or deactivate control outputs 126 (i.e., relays 128 and triacs 130) to provide the control signal to communications interface 132.

Control output module 124 may use any of a variety of control algorithms (e.g., state-based algorithms, extremum-seeking control algorithms, PID control algorithms, model predictive control algorithms, feedback control algorithms, etc.) to determine appropriate control actions for the controllable devices of HVAC system 20 (e.g., chiller 22, boiler 24, valves 94-96, actuators 60-64, actuators 97-99, cooling coil 82, heating coil 84, etc.) as a function of the compensated temperature and/or the compensated humidity. For example, if the compensated temperature is above the temperature set point, control output module 124 may determine that cooling coil 82 and/or fan 86 should be activated to decrease the temperature of the supply air 44 delivered to building zone 12. Similarly, if the compensated temperature is below the temperature set point, control output module 124 may determine that heating coil 84 and/or fan 86 should be activated to increase the temperature of the supply air 44 delivered to building zone 12. Control output module 124 may determine that a humidification or dehumidification component of HVAC system 20 should be activated or deactivated to control the compensated relative humidity to a humidity set point for building zone 12.

Figure 4:
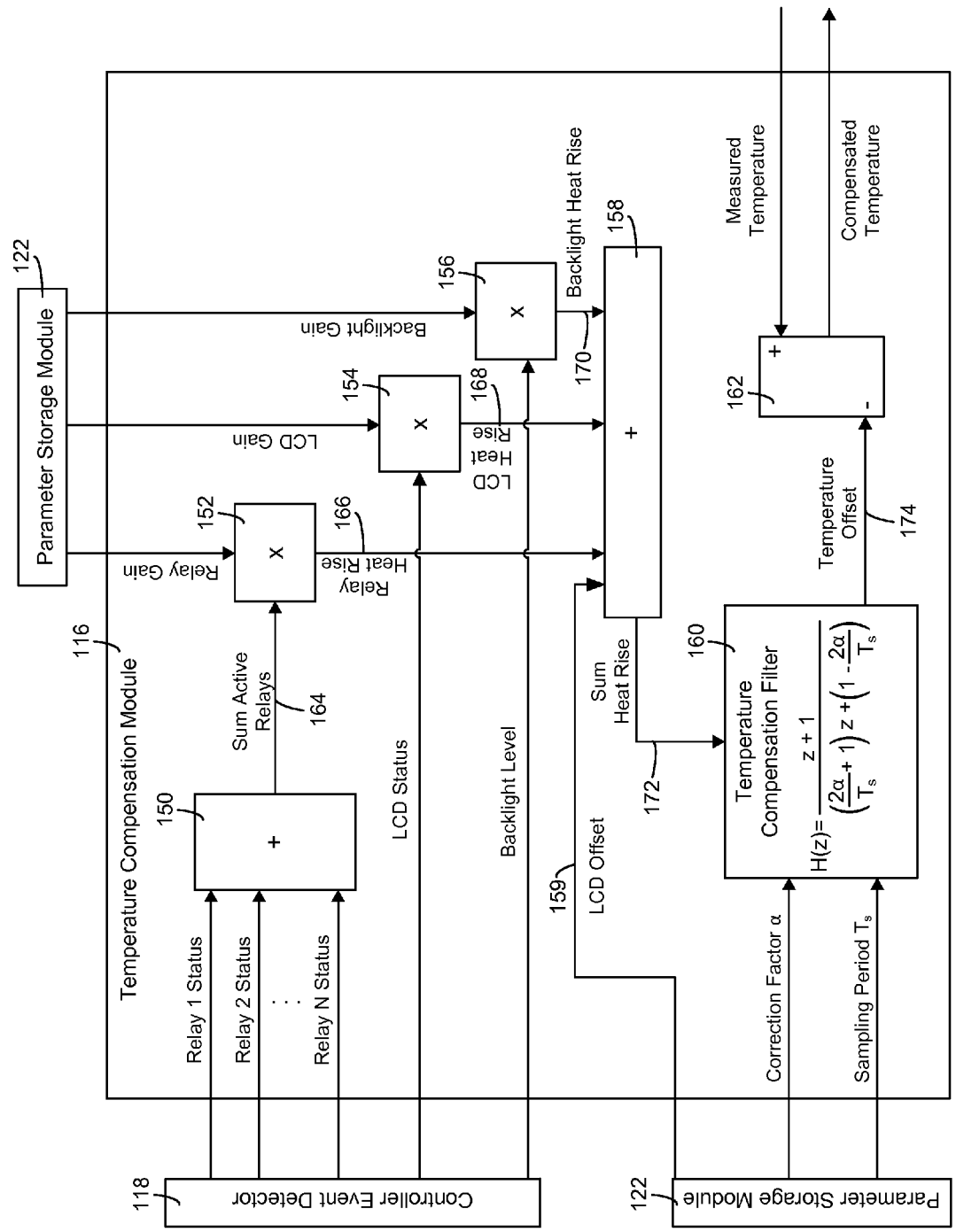
FIG. 4 is a block diagram illustrating a temperature compensation module of the zone controller of FIG. 3 in greater detail, according to an exemplary embodiment.

Referring now to FIG. 4, a block diagram illustrating temperature compensation module 116 in greater detail is shown, according to an exemplary embodiment. Temperature compensation module 116 can receive detected controller events from controller event detector 118. In FIG. 4, the detected controller events are shown to include the status of each of relays 128 (i.e., "Relay 1 Status," "Relay 2 Status," . . . "Relay N Status"), the status of LCD display 138 (i.e., "LCD Status"), and the level of backlight 136 (i.e., "Backlight Level"). The status of each relay may indicate whether the relay is currently on or off. The LCD status can indicate whether LCD display is currently on or off (e.g., 1 for on, 0 for off). The backlight level can indicate the brightness at which backlight 136 is currently illuminated (e.g., on a scale from 1-10, a percentage of the maximum illumination, etc.).

Temperature compensation module 116 can receive various gain parameters from parameter storage module 122. In FIG. 4, the received gain parameters are shown to include a "Relay Gain" parameter for each of the active relays, a "LCD Gain" parameter for LCD display 138, and a "Backlight Gain" parameter for backlight 136. Temperature compensation module 116 may receive a gain parameter for each of the detected controller events. Temperature compensation module 116 can also receive the correction factor α and the sampling period parameter $T_s$ from parameter storage module 122 and the measured temperature from sensor input module 114 in some embodiments.

Still referring to FIG. 4, temperature compensation module 116 is shown to include a relay status summation block 150. Block 150 may sum the total number of active relays to generate an output 164 (i.e., "Sum Active Relays") indicating the total number of relays that are currently active. The output 164 indicating the total number of active relays can be multiplied by the "Relay Gain" parameter at multiplication block 152 to generate a "Relay Heat Rise" output 166 in some embodiments. Output 166 may indicate the heat rise resulting from the operation of relays 128 in some embodiments.

Similarly, temperature compensation module 116 may multiply the "LCD Gain" parameter by the LCD status variable (e.g., 0 for off, 1 for on) at multiplication block 154 to generate a "LCD Heat Rise" output 168. Output 168 may indicate the heat rise resulting from the operation of LCD display 138. Temperature compensation module 116 may multiply the "Backlight Gain" parameter by the "Backlight Level" variable (e.g., a percentage or ratio of the maximum illumination of backlight 136) at multiplication block 156 to generate a "Backlight Heat Rise" output 170. Output 170 may indicate the heat rise resulting from the operation of backlight 136. LCD offset 159 may represent the baseline amount of heat generated by LCD display 138. For example, LCD offset 159 can represent the amount of heat generated when the LCD display 138 is idle. When the LCD display 138 is idle, it may source current. Sourcing current while idle is known as sleep current, which can generate heat even when LCD display 138 is idle.

Temperature compensation module 116 may sum the component-specific heat rise outputs 166-170 and LCD offset 159 at summation block 158 to generate a "Sum Heat Rise" output 172. Output 172 represents the total heat rise resulting from the operation of the various heat-generating components within housing 100. Advantageously, calculating the total heat rise in this manner allows temperature compensation module 116 to separately account for the heat produced by each individual heat-generating component within housing 100. If a component is not currently active (i.e., not generating heat), the component may be excluded from the heat rise calculation. Output 172 may be provided as an input to temperature compensation filter 160.

Still referring to FIG. 4, temperature compensation module 116 is shown to include a temperature compensation filter 160. Temperature compensation filter 160 may be a first order low pass filter which models the heat rise within housing 100 (i.e., the temperature gain resulting from the individual heat-generating components) using a first order transfer function. For example, the heat rise within housing 100 can be modeled using the Laplace domain transfer function:

$$H(s) = \frac{1}{\alpha s + 1}$$

where $\alpha$ is the heat rise correction factor as previously described (i.e., the temperature gain resulting from a component-specific heat-generating event within housing 100), s is the continuous-time domain filter variable, and H(s) is a ratio of the filter output to the filter input (i.e., H(s)=Y(s)/X(s)).

The transfer function H(s) can be discretized into the z-domain (i.e., the discrete-time domain) using a bilinear transform to substitute $$\frac{2}{T_s} \frac{z-1}{z+1}$$

for s in the Laplace domain transfer function as shown below:

$$H(z) = H\left(\frac{2}{T_s}\frac{z-1}{z+1}\right) = \frac{1}{\alpha\left(\frac{2}{T_s}\frac{z-1}{z+1}\right) + 1}$$

where $T_s$ is a time parameter representing the sampling period (i.e., the time between temperature measurements) as previously described. The parameter $T_s$ may also represent the time that has elapsed since temperature compensation filter 160 has last calculated the temperature offset (i.e., the filter execution period). The discrete-time domain transfer function H(z) can be rewritten as:

$$H(z) = \frac{z+1}{\left(\frac{2\alpha}{T_s}+1\right)z + \left(1 - \frac{2\alpha}{T_s}\right)}$$

as shown in FIG. 4.

Temperature compensation filter 160 can use the discrete-time transfer function H(z) to calculate the temperature offset 174 in some embodiments. For example, the discrete-time transfer function H(z) can be rewritten as a digital filter in casual form as:

$$H(z) = \frac{Y(z)}{X(z)} = \frac{1 + z^{-1}}{\left(\frac{2\alpha}{T_s}+1\right) + \left(1 - \frac{2\alpha}{T_s}\right)z^{-1}}$$

where the coefficients in the denominator $a_k$ are the feedbackward coefficients and the coefficients in the numerator $b_k$ are the feed-forward coefficients of the digital filter.

Rearranging the terms of the preceding equation yields:

$$Y(z)\left(\left(\frac{2\alpha}{T_s}+1\right) + \left(1 - \frac{2\alpha}{T_s}\right)z^{-1}\right) = X(z)(1 + z^{-1})$$

and taking the inverse z-transform of this equation yields:

$$\left(\frac{2\alpha}{T_s}+1\right)y_n + \left(1 - \frac{2\alpha}{T_s}\right)y_{n-1} = x_n + x_{n-1}$$

which can be rewritten as:

$$y_n = \left(\frac{2\alpha - T_s}{2\alpha + T_s}\right)y_{n-1} + \frac{x_n + x_{n-1}}{\left(\frac{2\alpha}{T_s} - 1\right)}$$

where $y_n$ is the output of the filter at time n, $y_{n-1}$ is the previous filter output (i.e., at time n−1), $x_n$ is the input to the filter at time n and $x_{n-1}$ is the input to the filter at time n−1.

In the preceding equation, the output $y_n$ represents the difference between the temperature measured by temperature sensor 102 and the actual ambient temperature of building zone 12 (i.e., temperature offset 174). The variable $y_{n-1}$ may be provided to temperature compensation filter 160 as a persisted offset to allow temperature compensation filter 160 to account for any heat that has previously been generated within housing 100. The inputs $x_n$ and $x_{n-1}$ represent the controller events that generate heat within housing 100 and contribute to the temperature offset 174. For example, input $x_n$ may be determined by summing all of the heat-generating events that occur within housing 100 between time n−1 and time n (i.e., the events detected by controller event detector 118) multiplied by their steady-state temperature gains, as described with reference to components 150-158. The sum of the heat-generating events (i.e., the "Sum Heat Rise" variable calculated by summation block 158) may be provided to temperature compensation filter 160 and used as input $x_n$.

Still referring to FIG. 4, temperature compensation module 116 is shown to include a subtractor block 162. Subtractor block 162 may receive the temperature offset 174 from temperature compensation filter 160 and the measured temperature from sensor input module 114. Subtractor block 162 may subtract the temperature offset 174 (i.e., the variable $y_n$) from the measured temperature to calculate the actual ambient temperature of building zone 12 (i.e., the compensated temperature). In some embodiments, subtractor block 162 may add the temperature offset 174 (i.e., the variable $y_n$) to the measured temperature to calculate the actual ambient temperature of building zone 12 (i.e., the compensated temperature).

Figure 5A:
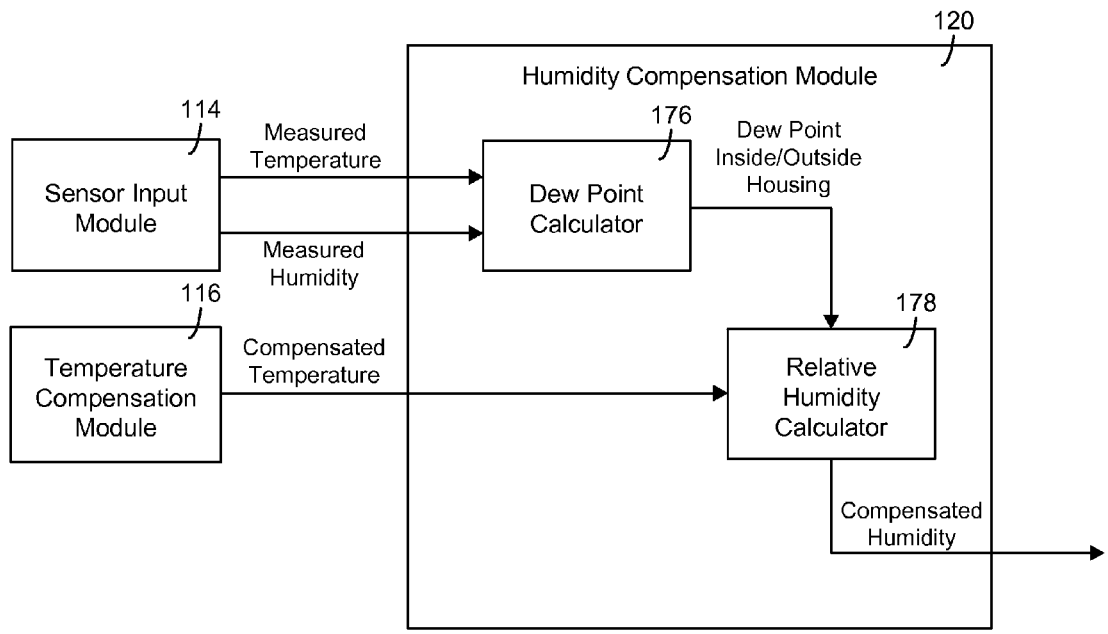
FIGS. 5A-5B are block diagrams illustrating a humidity compensation module of the zone controller of FIG. 3 in greater detail, according to an exemplary embodiment.
Figure 5B:
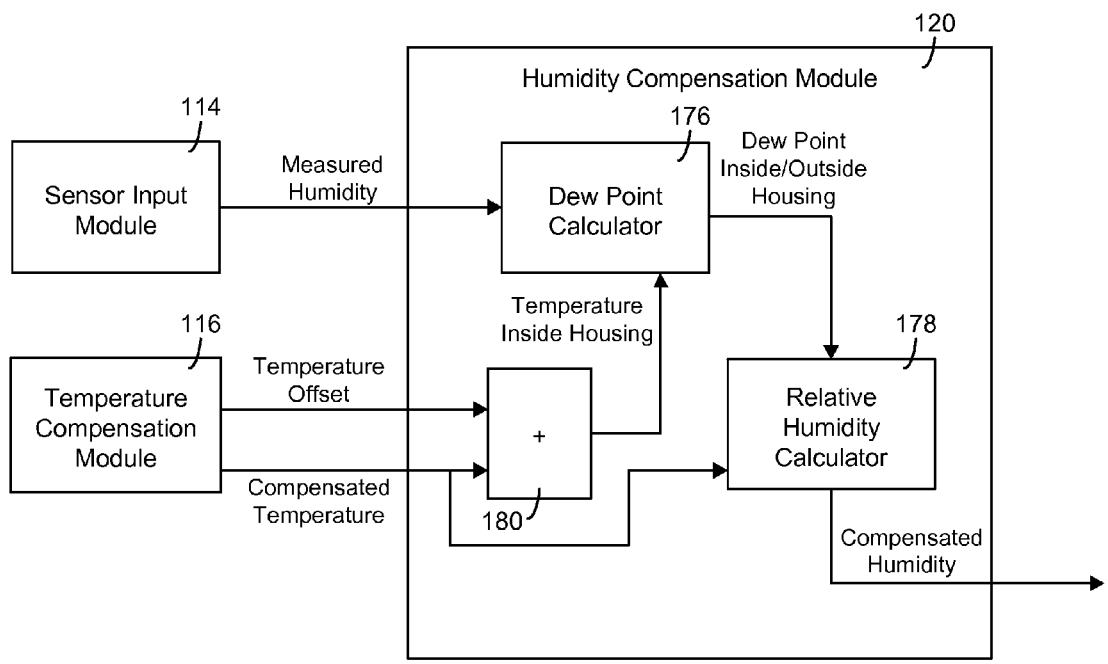

Referring now to FIGS. 5A-5B, block diagrams illustrating temperature compensation module 120 in greater detail are shown, according to various exemplary embodiments. In FIG. 5A, humidity compensation module 120 is shown receiving the measured temperature and the measured humidity from sensor input module 114. The measured humidity represents the relative humidity measured by humidity sensor 104, which is the relative humidity within housing 100.

Humidity compensation module 120 is shown to include a dew point calculator 176. Dew point calculator 176 may be configured to calculate the dew point of the air inside housing 100 as a function of the measured temperature and the measured relative humidity (e.g., using psychometrics). Dew point calculator 176 provides the calculated dew point of the air inside housing 100 to a relative humidity calculator 178. Since the air inside housing 100 and the air outside housing 100 have the same moisture content, the dew point of the air outside housing 100 may be the same as the dew point of the air inside housing 100.

Relative humidity calculator 178 receives the calculated dew point of the air inside housing 100 from dew point calculator 176 and the compensated temperature from temperature compensation module 116. The compensated temperature represents the temperature of the air within building zone 12 outside housing 100. Advantageously, humidity compensation module 120 may use the compensated temperature and the dew point of the air inside housing 100 (which is the same as the dew point of the air outside housing 100) to calculate a compensated humidity representing the actual relative humidity of the air in building zone 12 outside housing 100.

In FIG. 5B, an alternative embodiment is shown in which humidity compensation module 120 receives only the measured humidity from sensor input module 114. In FIG. 5B, humidity compensation module 120 is shown to include a summation block 180 which receives both the compensated temperature and the temperature offset from temperature compensation module 116 according to some embodiments. The temperature offset represents the difference between the measured temperature (i.e., the temperature inside housing 100) and the compensated temperature (i.e., temperature offset=measured temperature−compensated temperature). Summation block 180 can add the temperature offset to the compensated temperature to determine the temperature inside housing 100 in some embodiments. The temperature inside housing 100 calculated by summation block 180 may be provided to dew point calculator 176 and used in conjunction with the measured humidity to calculate the dew point of the air inside housing 100 in some embodiments. The humidity compensation routine then proceeds as described with reference to FIG. 5A.

Figure 6:
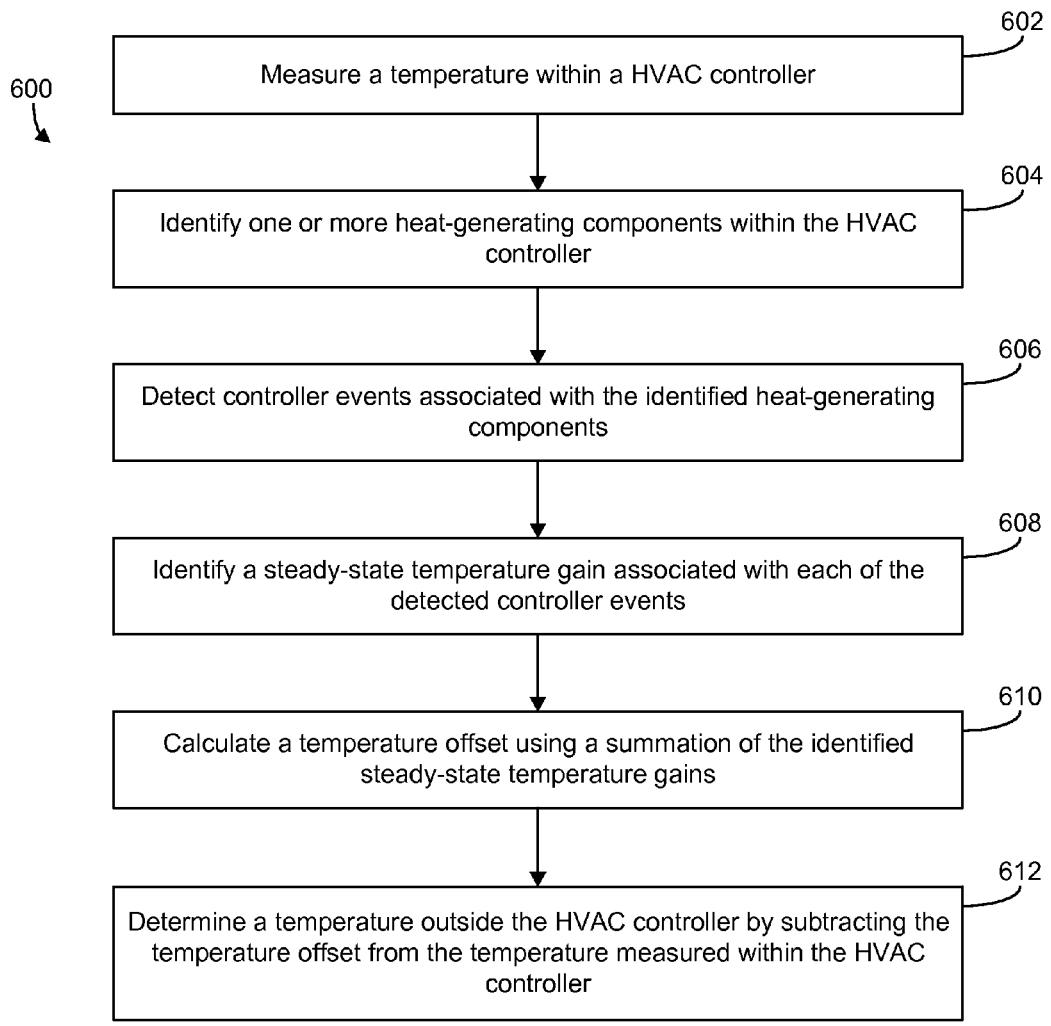
FIG. 6 is a flowchart of operations for compensating for the heat generated within a HVAC controller, according to an exemplary embodiment.

Referring now to FIG. 6, a flowchart of a flow 600 for compensating for the heat generated within a HVAC controller is shown, according to some embodiments. In various embodiments, flow 600 may be performed by zone controller 14 or a controller that receives inputs from zone controller 14 (e.g., AHU controller 70, supervisory controller 72, etc.). Flow 600 may be an event-driven compensation process and may be used to determine the actual ambient temperature of a building zone 12 in which zone controller 14 is located. Advantageously, flow 600 allows the HVAC controller to determine a temperature offset based on the particular controller events that generate heat within the HVAC controller. Each controller event can be independently included or not included in the ambient temperature determination based on whether the controller event is detected. Using controller events in this manner allows the HVAC controller to calculate the temperature offset with greater granularity and accuracy relative to traditional heat rise calculations that only consider the amount of time since the controller (as a whole) was powered on.

Flow 600 is shown to include measuring a temperature within a HVAC controller (step 602). Step 602 may be performed by a temperature sensor (e.g., temperature sensor 102) located within a housing of the HVAC controller. The HVAC controller may be positioned within a building zone. For example, the HVAC controller may be a wall-mounted thermostat and/or humidistat configured to measure and control the temperature and/or humidity of the building zone. The temperature measured in step 602 may be higher than the actual ambient temperature of the building zone due to the heat generated internally within the HVAC controller.

Flow 600 is shown to include identifying one or more heat-generating components within the HVAC controller (step 604) and detecting controller events associated with the heat-generating components (step 606). Heat-generating components may include, for example, a power supply, an LCD display, a backlight for the LCD display, control outputs such as relays and triacs, a processor, and/or any other component that generates heat within the HVAC controller when the component is used. Controller events associated with the heat-generating components may include, for example, activating the LCD display, illuminating the backlight, providing control outputs via the relays and triacs, activating the power supply, using the processor, and/or any other action or event that generates heat within the HVAC controller. The controller events may be a function of the brightness of the backlight, whether the LCD display is currently active, and/or whether a control signal is currently being provided to the HVAC system via the control outputs. In some embodiments, step 606 is performed by controller event detector 118, as described with reference to FIG. 3.

Still referring to FIG. 6, flow 600 is shown to include identifying a steady-state temperature gain associated with each of the detected controller events (step 608). The steady-state temperature gains may be stored in a memory module of the HVAC controller (e.g., parameter storage module 122) or retrieved from an external data source. In some embodiments, each of the detected or detectable controller events is associated with a steady-state temperature gain. For example, the steady-state temperature gains may include a temperature gain associated with activating the LCD display ("LCD Gain"), a temperature gain associated with illuminating the backlight at full brightness or any of the intermediate brightness levels ("Backlight Gain"), a temperature gain associated with activating each of the relays and triacs ("Relay Gain"), and/or any other temperature gains that correspond to any of the detectable controller events. Each temperature gain may correspond to a temperature increase resulting from the associated controller event. Differences in the amount of heat generated by each controller event may be indicated by the temperature gains associated with each controller event.

Flow 600 is shown to include calculating a temperature offset using a summation of the identified steady-state temperature gains (step 610). In some embodiments, step 610 is performed by temperature compensation module 116, as described with reference to FIGS. 3-4. Step 610 may include receiving the temperature measured in step 602, the controller events detected in step 606, and the temperature gains identified in step 608. Step 610 may include multiplying each of the detected controller events by the event gain associated with the controller event. In some embodiments, step 610 includes summing the event gains associated with the detected controller events to calculate a heat rise resulting from the detected controller events.

In some embodiments, step 610 includes a temperature compensation filter to calculate the temperature offset. The temperature compensation filter may be a first order low pass filter which models the heat rise within the HVAC controller using a first order transfer function. Step 610 may include providing the heat rise resulting from the detected controller events as an input to the temperature compensation filter. The temperature compensation filter may output the temperature offset as a function of the heat rise resulting from the detected controller events, the correction factor α, and the sampling period parameter $T_s$, as described with reference to FIGS. 3-4.

Flow 600 is shown to include determining a temperature outside the HVAC controller by subtracting and/or adding the temperature offset from the temperature measured within the HVAC controller (step 612). The temperature outside the HVAC controller may be a compensated temperature representing the ambient temperature of the building zone in which the controller is located. The compensated temperature may be used for any of a variety of control applications such as generating a control signal for the HVAC system based on a difference between the compensated temperature and a temperature set point. In some embodiments, the compensated temperature is used to calculate the relative humidity outside the HVAC controller, as described with reference to FIG. 7.

Figure 7:
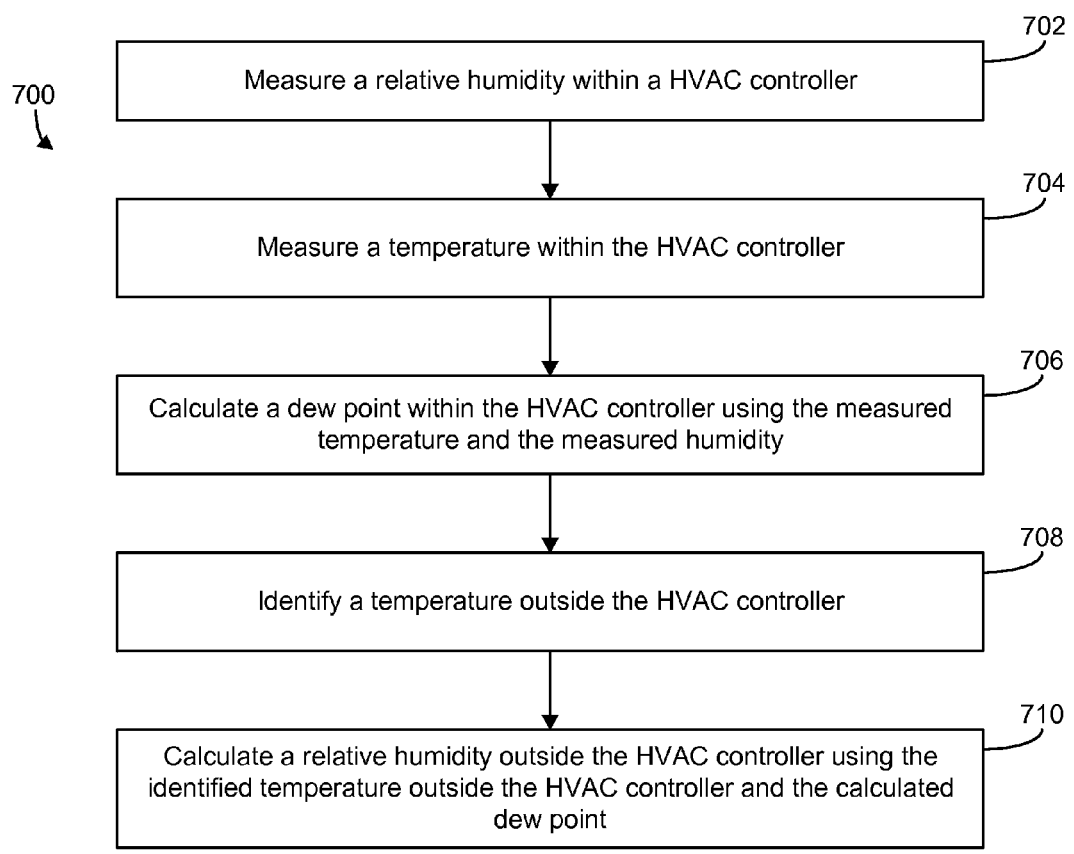
FIG. 7 is a flowchart of operations for determining the relative humidity of a building zone using a compensated zone temperature determined according to the process of FIG. 6, according to an exemplary embodiment.

Referring now to FIG. 7, a flowchart of a flow 700 for determining the relative humidity of a building zone using a compensated zone temperature is shown, according to an exemplary embodiment. In various embodiments, flow 700 may be performed by zone controller 14 or a controller that receives inputs from zone controller 14 (e.g., AHU controller 70, supervisory controller 72, etc.). Flow 700 may be performed subsequent to flow 600 and may use one or more of the variables calculated by flow 600 (e.g., the compensated temperature, the temperature offset, etc.).

Flow 700 is shown to include measuring a relative humidity within a HVAC controller (step 702) and measuring a temperature within the HVAC controller (step 704). The HVAC controller may be positioned within a building zone. For example, the HVAC controller may be a wall-mounted thermostat and/or humidistat configured to measure and control the temperature and/or humidity of the building zone. The temperature measured in step 704 may be higher than the actual ambient temperature of the building zone due to the heat generated internally within the HVAC controller. The air inside the HVAC controller and outside the HVAC controller may have the same moisture content; however, since the temperature within the HVAC controller is greater than the ambient temperature of the building zone, the measured relative humidity within the HVAC controller may be lower than the actual relative humidity of the air outside the HVAC controller due to the greater moisture capacity of warmer air.

Still referring to FIG. 7, flow 700 is shown to include calculating a dew point within the HVAC controller using the measured temperature and the measured humidity (step 706) and identifying a temperature outside the HVAC controller (step 708). Step 706 may include using psychometrics to determine the actual dew point of the warmer air within the HVAC controller using the temperature and humidity measured in steps 702-704. Step 708 may include receiving the compensated temperature from temperature compensation module 116 and/or flow 600. In some embodiments, step 708 may include receiving the compensated temperature determined in flow 1000. The compensated temperature represents the actual temperature of the outside the HVAC controller.

Flow 700 is shown to include calculating a relative humidity outside the HVAC controller using the identified temperature outside the HVAC controller and the calculated dew point (step 710). Step 710 may include using psychometrics to determine the actual relative humidity of the cooler air outside the HVAC controller using the temperature identified in step 708 and the dew point calculated in step 706. Since the air inside the HVAC controller and the air outside the HVAC controller have the same moisture content, the dew point of the air outside the HVAC controller may be the same as the dew point of the air inside the HVAC controller. Thus, the dew point calculated in step 706 may be used as an input to step 710 to calculate the relative humidity outside the controller.

Figure 8:
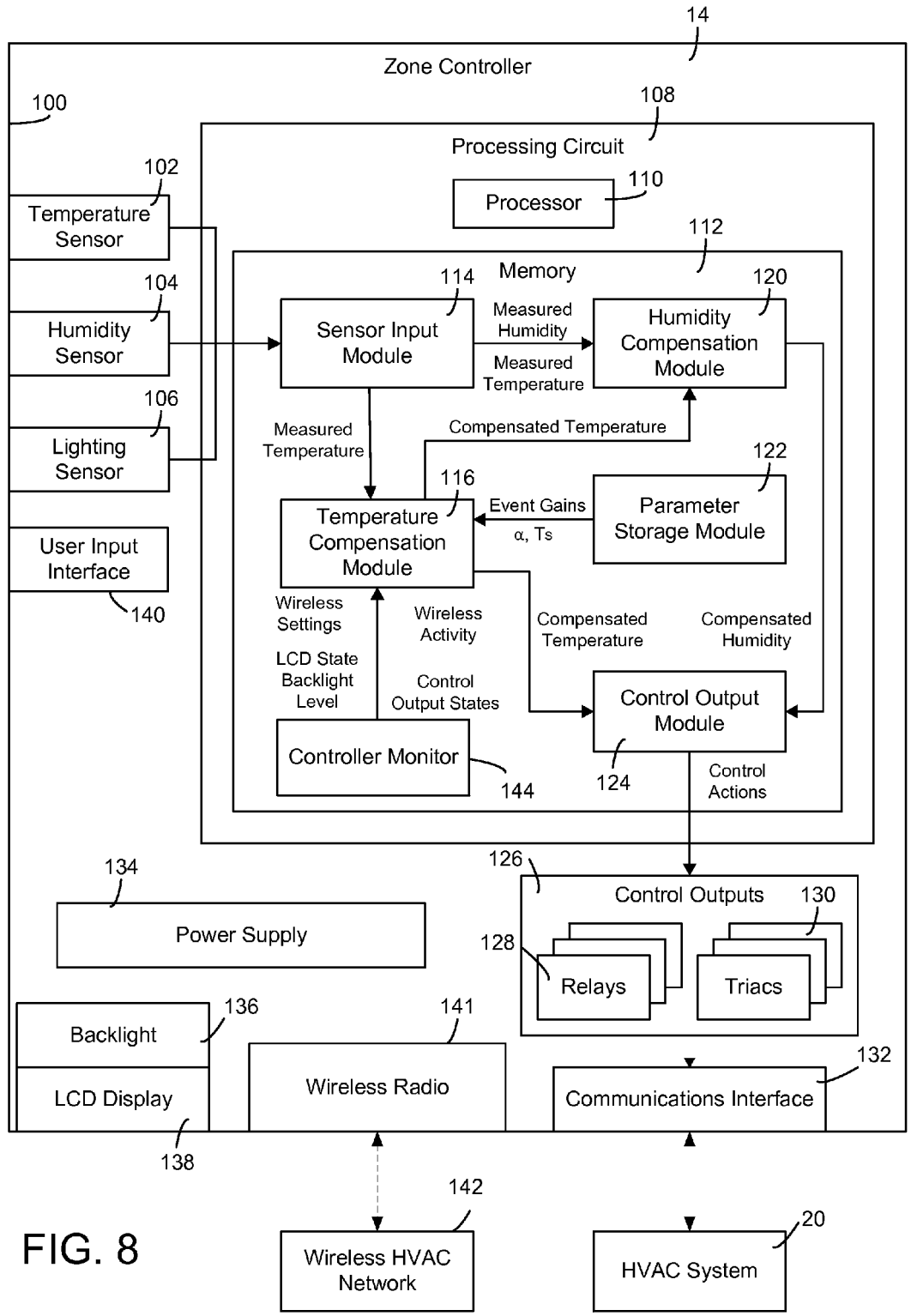
FIG. 8 is a block diagram illustrating one of the zone controllers of FIG. 1 including a wireless radio, according to an exemplary embodiment.

Referring now to FIG. 8, a block diagram illustrating zone controller 14 in greater detail is shown, according to another exemplary embodiment. In FIG. 8, zone controller 14 is shown to include many of the same components previously described with reference to FIGS. 3-4. Zone controller 14 is also shown to include wireless radio 141 connected to wireless HVAC network 142. Zone controller 14 may be located within building zone 12 and may be configured to measure one or more variable states or conditions (i.e., environmental conditions) within building zone 12 and communicate the variables states or conditions to wireless HVAC network 142 with wireless radio 141. Wireless radio 141 can receive commands from the wireless HVAC network 142 to control outputs of the zone controller 14 such as the relays 128 and triacs 130.

In some embodiments, wireless radio 141 is at least one of a plurality of radio types. The radio types may be a WiFi radio, a Bluetooth radio, a ZigBee radio and any other radio type. Wireless radio 141 communicates wirelessly to wireless HVAC network 142 with at least one of the radio types. Wireless HVAC network 142 may include a plurality of wireless devices. The wireless devices include at least one of a router, a cellular device, a wireless coordinator, and one or more zone controllers 14. Wireless radio 141 may communicate in a plurality of a wireless device topologies. The device communication topologies may be at least one of a star topology, a tree topology, and a mesh topology.

In the star topology, zone controller 14 may be one of a plurality of end devices. The end devices may communicate with a single coordinator of the wireless HVAC network 142. In the tree topology, the zone controller 14 may communicate to a plurality of routers of the wireless HVAC network 142. In some embodiments, the plurality of routers of wireless HVAC network 142 communicate to a single coordinator of wireless HVAC network 142. In the mesh topology, one coordinator of wireless HVAC network 142, a plurality of routers of wireless HVAC network 142, and a plurality of zone controllers 14 create a multi-hop network where all devices communicate to the coordinator of wireless HVAC network 142 through changing paths. The changing paths may be combinations of zone controllers 14 and routers of the wireless HVAC network 142. The paths may change based on signal strength between the routers of wireless HVAC network 142, the coordinator of wireless HVAC network 142, and the zone controllers 14.

In some embodiments, the wireless radio 141 communicates to wireless HVAC network 142 by wirelessly transmitting packets of data. When wirelessly transmitting packets of data, wireless radio 141 may generate heat. The heat generated by wireless radio 141 may be related to the rate at which wireless radio 141 transmits data and/or the amount of data transmitted by wireless radio 141. In some embodiments, controller monitor 144 determines the rate at which wireless radio 141 transmits data. In some embodiments, controller monitor 144 determines the amount of data transmitted over a time period t. Controller monitor 144 can also determine the maximum amount of transmitted data that wireless radio 141 is capable of transmitting over the time period t and/or the maximum transmission rate. Controller monitor 144 may use a transmission frequency band, a modulation scheme, a wireless protocol, settings defined by a user, and/or settings defined by wireless HVAC network 142 to determine the maximum transmission rate and/or the maximum amount of data that wireless radio 141 is capable of transmitting over the time period.

In some embodiments, controller monitor 144 retrieves a firmware preset for the time period t and the maximum amount of data capable of being transmitted over the time period t. The firmware preset may be stored in the parameter storage module 122 of the zone controller 14. In some embodiments, controller monitor 144 calculates a maximum wireless data value indicating the maximum transmission rate and/or the maximum amount of data that wireless radio 141 is capable of transmitting over the time period. Controller monitor 144 may calculate the maximum wireless data value from the settings of the wireless radio 141. In some embodiments, controller monitor 144 monitors wireless radio 141 to determine maximum wireless data value. In another embodiment, controller monitor 144 receives the maximum wireless data value from wireless HVAC network 142.

In some embodiments, controller monitor 144 sets t to a plurality of time periods. Controller monitor 144 may have a default value for t. In other embodiments, the controller monitor 144 receives a value for t from wireless HVAC network 142. In other embodiments, t is a user adjustable value that is changed through user input interface 140. In some embodiments, controller monitor 144 is configured to determine an optimal value for t. The optimal value may be a value that results in highly accurate temperature compensation.

In some embodiments, controller monitor 144 sends wireless settings and wireless activity to the temperature compensation module 116. The wireless settings may include the maximum transmission rate over the time period t and/or the wireless activity over the time period t. Wireless activity can include the wireless radio 141 sending or receiving data from wireless HVAC network 142. The wireless activity can include an indication of the amount of data transmitted by the wireless radio 141 over the time period t. Temperature compensation module 116 may use the wireless activity and wireless settings, the LCD state backlight level, and/or the control output states to determine a compensated temperature.

Figure 9:
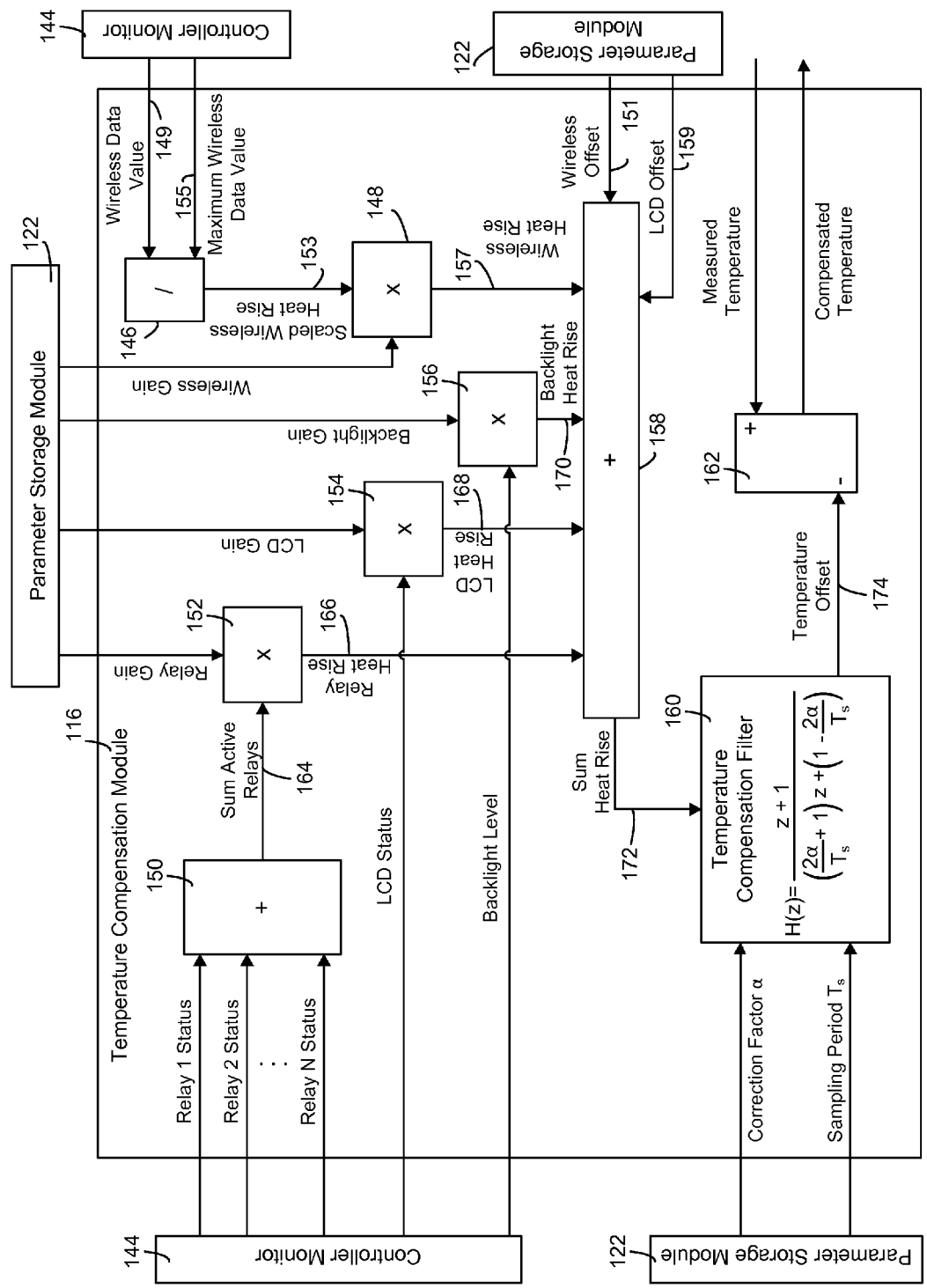
FIG. 9 is a block diagram illustrating a temperature compensation module of the zone controller of FIG. 8 in greater detail, according to an exemplary embodiment.

Referring now to FIG. 9, a block diagram illustrating temperature compensation module 116 in greater detail is shown, according to an exemplary embodiment. In FIG. 9, an embodiment is shown in which the controller monitor 144 provides a wireless data value 149 and a maximum wireless data value 155 to the temperature compensation module 116. Wireless data value 149 can include the actual amount of data transmitted by wireless radio 141 over the time period t and/or the actual wireless transmission rate. Maximum wireless data value 155 can include the maximum amount of data capable of being transmitted by wireless radio 141 over the time period t (e.g., based on wireless radio settings) and/or the maximum wireless transmission rate. The temperature compensation module 116 uses the wireless data value 149 and the maximum wireless data value 155 to determine a compensated temperature.

In FIG. 9, temperature compensation module 116 is shown to divide the wireless data value 149 by the maximum wireless data value 155 in division block 146 to determine a ratio or percentage. The ratio or percentage may indicate the actual utilization of wireless radio 141 relative to the maximum possible utilization (e.g., operating at 46% capacity, transmitted 46% of maximum possible data throughput) and may be proportional to the amount of heat generated by the wireless radio 141 over the time period t. The ratio is the scaled wireless heat rise 153 and may be multiplied by a wireless gain value in multiplication block 148 to determine a wireless heat rise value 157. The wireless gain may be stored in parameter storage module 122. According to the embodiment in FIG. 9, the wireless heat rise value 157 is provided to summation block 158. Summation block 158 adds the relay heat rise, the LCD heat rise, the backlight heat rise, the wireless heat rise, LCD offset 159 and a wireless offset 151 stored in the parameter storage module 122. The result of the summation is the sum heat rise 172 which is used by temperature compensation filter 160 to determine the temperature offset 174.

The wireless offset 151 may represent the baseline amount of heat generated by the wireless radio 141 regardless of the amount of data transmitted and/or the data transmission rate. For example, wireless offset 151 can represent the amount of heat generated when the wireless radio 141 is idle, has not transmitted any data, or has transmitted an amount of data under a threshold. When the wireless radio 141 is idle, it may source current. Sourcing current while idle is known as sleep current, which can generate heat even when no data is being transmitted. The wireless offset 151 can account for the baseline amount of heat that is generated by wireless radio 141 when wireless radio 141 is powered, independent from the amount of heat generated by transmitting data.

Figure 10:
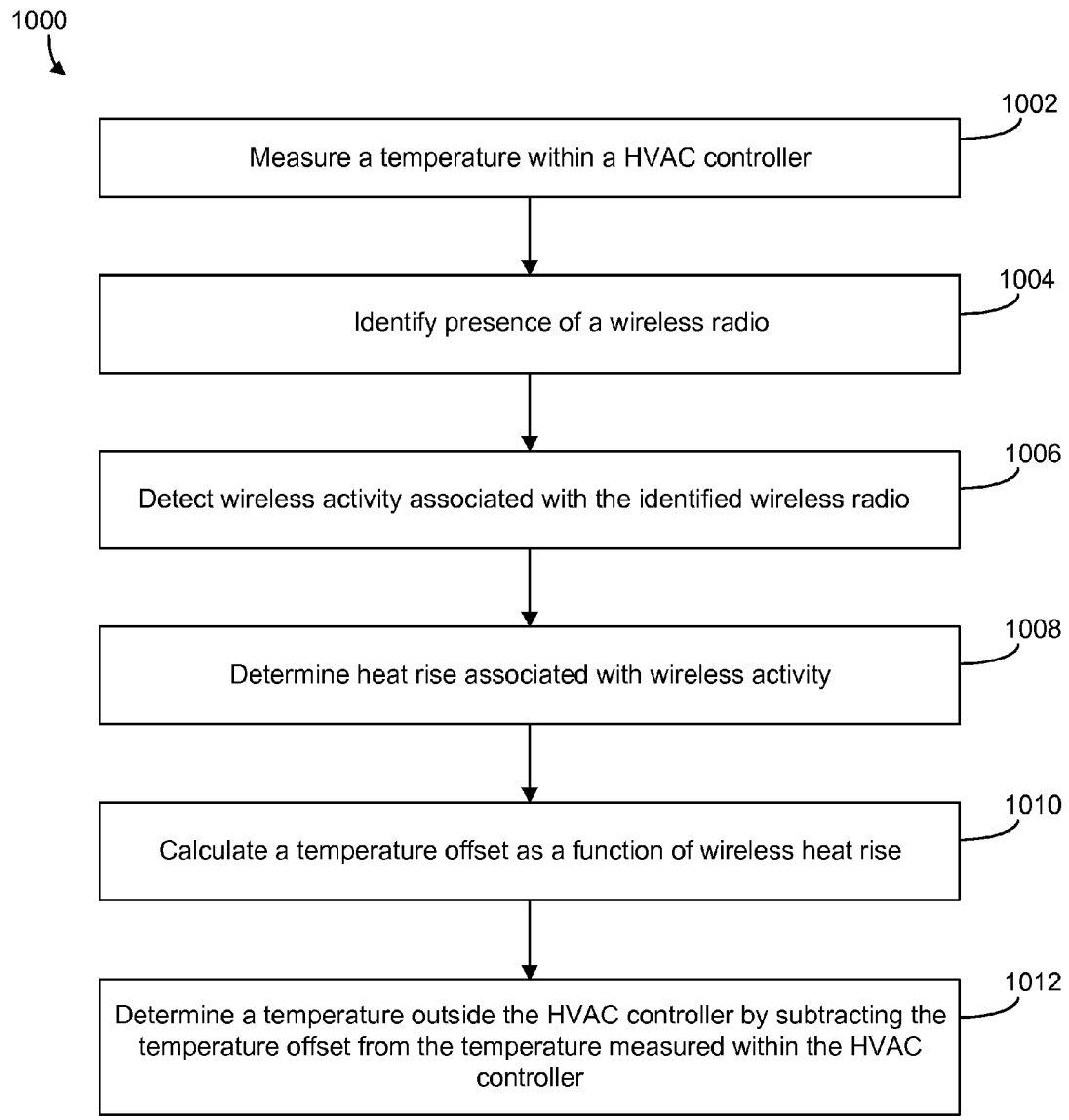
FIG. 10 is a flowchart of operations for compensating for the heat generated within a HVAC controller by a wireless radio, according to an exemplary embodiment.

Referring now to FIG. 10, a flowchart of flow 1000 for compensating for the heat generated within a HVAC controller by a wireless radio is shown, according to some embodiments. In various embodiments, flow 1000 may be performed by zone controller 14 or a controller that receives inputs from zone controller 14 (e.g., AHU controller 70, supervisory controller 72, etc.). Flow 1000 allows the HVAC controller to determine a temperature offset based on the wireless activity of a wireless radio that generates heat within the HVAC controller. Monitoring wireless activity in this manner allows the HVAC controller to calculate the temperature offset with greater granularity and accuracy relative to traditional heat rise calculations that only consider the amount of time since the controller (as a whole) was powered on.

Flow 1000 is shown to include measuring a temperature within a HVAC controller (step 1002). Step 1002 may be performed by a temperature sensor (e.g., temperature sensor 102) located within a housing of the HVAC controller. The HVAC controller may be positioned within a building zone. For example, the HVAC controller may be a wall-mounted thermostat and/or humidistat configured to measure and control the temperature and/or humidity of the building zone. The temperature measured in step 1002 may be higher than the actual ambient temperature of the building zone due to the heat generated internally within the HVAC controller.

Flow 1000 is shown to include identifying a wireless radio within the HVAC controller (step 1004). In some embodiments, the presence of the wireless radio is based on the firmware settings of the HVAC controller. The firmware settings may identify the type of wireless radio (e.g. Bluethooth, WiFi, Zigbee, etc) and if the wireless radio is present in the HVAC controller. In some embodiments, the zone controller performs a step to identify the wireless radio. The step may be attempting communication between a processor or other computing device of the HVAC controller and the wireless radio. Successful communication between the processor and the wireless radio identifies that the wireless radio is present in the HVAC controller. In some embodiments, this step of testing communication is performed a predetermined amount of times on every boot cycle of the HVAC controller. In some embodiments, the HVAC controller waits a predetermined amount of time for a wireless radio to send signals to the HVAC controller. If a processor or other computing device receives data from a wireless radio in the predetermined amount of time, the HVAC controller can determine that a wireless radio is present.

Flow 1000 is shown to include detecting wireless activity associated with a wireless radio (step 1006). In some embodiments, a controller monitor (e.g. controller monitor 144) is configured to determine wireless activity. In some embodiments, the wireless activity is a wireless data value (e.g. wireless data value 149 in FIG. 9) and a maximum wireless data value (e.g. maximum wireless data value 155 in FIG. 9). The wireless data value may be the amount of data sent in a time interval and may be determined by monitoring the amount of data transmitted by a wireless radio. For example, the controller monitor may determine that a wireless radio sent 13.5 Mbits during a one second time interval. The maximum wireless data value may be the maximum amount of data that can be sent during the time interval. For example, the maximum amount of wireless data that can be sent by a wireless radio may be 15 Mbits during a one second time interval. In some embodiments, the maximum amount of data is based on a firmware setting. In some embodiments, a controller monitor (e.g. controller monitor 144) may determine the maximum wireless data value by performing a calculation based on the model and/or specification of a wireless radio present in the HVAC controller, the frequency at which the wireless radio operates, the modulation scheme the wireless radio uses, and/or any other factor that affects the maximum wireless data that the wireless radio can transmit.

In some embodiments, heat-generating components such as a power supply, an LCD display, a backlight for the LCD display, control outputs such as relays and triacs, a processor, and/or any other component that generates heat within the HVAC controller when the components are present in the HVAC controller. Controller events associated with the heat-generating components may include, for example, activating the LCD display, illuminating the backlight, providing control outputs via the relays and triacs, activating the power supply, using the processor, transmitting wireless data with the wireless radio, and/or any other action or event that generates heat within the HVAC controller. These controller events may be monitored by a controller monitor (e.g. controller monitor 144). The controller events may be a function of the brightness of the backlight, whether the LCD display is currently active, and/or whether a control signal is currently being provided to the HVAC system via the control outputs.

Still referring to FIG. 10, flow 1000 is shown to determine a wireless heat rise associated with the wireless activity of a wireless radio (step 1008). Step 1008 may include determining a scaled wireless heat rise. The scaled wireless heat rise may represent a scaled amount of heat generated by transmitting wireless data. The scaled wireless heat rise may be a ratio or percentage indicating the actual utilization of the wireless radio relative to the maximum possible utilization (e.g., operating at 46% capacity, transmitted 46% of maximum possible data throughput) and may be proportional to the amount of heat generated by the wireless radio over a time period t. In some embodiments, the scaled wireless heat rise is determined by dividing the wireless data value by the maximum wireless data value. The result of this division is a scaled wireless heat rise which represents the heat generated relative to the maximum amount of wireless data that can be transmitted. The scaled wireless heat rise can be multiplied by a wireless gain. The wireless gain may be the amount of heat generated by the wireless radio if the wireless radio transmits at a maximum rate. Multiplying the scaled wireless heat rise by the wireless gain results in an actual wireless heat rise (e.g. wireless heat rise 157). The wireless heat rise may be an amount of heat generated by the wireless radio.

In some embodiments, heat rise values associated with heat generating components such as relays, LCDs, backlights may be determined. A gain associated with each of the heat generating components (e.g. "Relay Gain", "LCD Gain", and "Backlight Gain") may be stored in a parameter storage module (e.g. parameter storage module 122) of the HVAC controller or may be retrieved from an external data source. In some embodiments, detectable controller events are associated with a heat rise. For example, the heat rises may include a heat rise associated with activating the LCD display, a heat rise associated with illuminating the backlight at full brightness or any of the intermediate brightness levels, a heat rise associated with activating each of the relays and triacs, and/or any other heat rises that correspond to any of the detectable controller events. Each heat rise may correspond to a temperature increase resulting from the associated controller event. Differences in the amount of heat generated by each controller event may be indicated by the heat rises associated with each controller event. In some embodiments, all of the heat rise values may be summed. In some embodiments, when the only heat generating component is the wireless radio, no summation is necessary.

Flow 1000 is shown to include calculating a temperature offset using the wireless heat rise (step 1010). In some embodiments, the temperature offset is calculated with a summation of heat rises, associated with a number of heat generating components. For example, a summation of heat rises associated with multiple heat generating components may be the summation of the wireless heat rise, a heat rise associated with a backlight, a heat rise associated with an LCD, and/or a heat rise associated with one or more relays. Referring to FIG. 10, step 1010 may be performed by temperature compensation module 160, as described with reference to FIGS. 8-9. Step 1010 may include receiving the temperature measured in step 1002 and the wireless heat rise determined in step 1008.

In some embodiments, step 1010 includes using a temperature compensation filter to calculate the temperature offset. The temperature compensation filter may be a first order low pass filter which models the wireless heat rise within the HVAC controller using a first order transfer function. The temperature compensation filter may be temperature compensation filter 160 described in FIGS. 8-9. Step 1010 may include providing the wireless heat rise as an input to the temperature compensation filter. The temperature compensation filter may output the temperature offset as a function of the heat rise resulting from the wireless activity, a correction factor α, and a sampling period parameter $T_s$. The correction factor α may represent the wireless heat rise within a housing of the HVAC controller resulting from the wireless activity and may be a function of the thermal properties of the HVAC controller (e.g., thermal resistance, heat capacity, etc.). The sampling period parameter $T_s$ may indicate a time between consecutive temperature measurements such as the temperature measurements in step 1002.

Flow 1000 is shown to include determining a temperature outside the HVAC controller by subtracting the temperature offset from the temperature measured within the HVAC controller (step 1012). The temperature outside the HVAC controller may be a compensated temperature representing the ambient temperature of the building zone in which the controller is located. The compensated temperature may be used for any of a variety of control applications such as generating a control signal for the HVAC system based on a difference between the compensated temperature and a temperature set point. In some embodiments, the compensated temperature is used to calculate the relative humidity outside the HVAC controller, as described with reference to FIG. 7.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An HVAC controller located within a building zone, the controller comprising:
    a housing;
    a wireless radio contained within the housing and configured to transmit data via a wireless HVAC network;
    a controller monitor configured to detect wireless activity of the wireless radio, the wireless activity generating heat inside the housing and causing a temperature inside the housing to exceed a temperature of the building zone outside the housing and generate an actual wireless data value representing an actual amount of wireless data transmitted by the wireless radio over a time period;
    a temperature sensor configured to measure the temperature inside the housing; and
    a temperature compensation module configured to determine a wireless heat rise resulting from the wireless activity as a function of the actual wireless data value, to calculate a temperature offset based on the wireless heat rise, and to determine the temperature of the building zone outside the housing by subtracting the temperature offset from the temperature measured inside the housing.

2. The HVAC controller of claim 1, wherein the wireless radio causes the temperature inside the housing to exceed the temperature of the building zone outside the housing by generating the heat as a result of wirelessly communicating through a mesh topology to at least one of a Zigbee coordinator and a Zigbee router.

3. The controller of claim 1, wherein the temperature compensation module determines the wireless heat rise resulting from the wireless activity by:
    identifying a maximum wireless data value representing a maximum amount of wireless data capable of being transmitted by the wireless radio over the time period;
    dividing the actual wireless data value by the maximum wireless data value to determine a scaled heat rise generated by the wireless radio over a time period; and
    multiplying the scaled heat rise by a wireless gain to determine the wireless heat rise.

4. The controller of claim 3, wherein the controller monitor is configured to generate the maximum wireless data value by performing at least one of:
    identifying a preset firmware value for maximum wireless data;

receiving a value for maximum wireless data from a user setting;
receiving a value for maximum wireless data from the wireless HVAC network; and
calculating a value for maximum wireless data from at least one of a wireless protocol type, a modulation scheme, and a transmission frequency band.

5. The controller of claim 1, wherein the temperature compensation module is configured to calculate the temperature offset as a function of both a wireless offset and the wireless heat rise resulting from the wireless activity;
wherein the wireless offset represents a baseline amount of heat generated by the wireless radio independent from the wireless heat rise resulting from the wireless activity.

6. The controller of claim 5, wherein:
the temperature compensation module comprises a temperature compensation filter that uses a first order low pass transfer function to calculate the temperature offset; and
the temperature compensation module is further configured to generate an input for the temperature compensation filter by summing at least the wireless offset and the wireless heat rise resulting from the wireless activity.

7. The controller of claim 6, wherein the temperature compensation filter is a discrete-time digital filter that outputs the temperature offset as a function of a previous temperature offset and the wireless heat rise resulting from the wireless activity, wherein the wireless heat rise occurs after the previous temperature offset is calculated.

8. The controller of claim 6, wherein the temperature compensation module is further configured to:
store the temperature offset upon powering off the controller; and
use the stored temperature offset as the previous temperature offset in the temperature compensation filter when the controller is powered on.

9. The controller of claim 8, wherein upon powering on the controller, the temperature compensation module is configured to:
determine whether the controller has been powered off for a period of time exceeding a threshold;
use the stored temperature offset as the previous temperature offset in the temperature compensation filter if the controller has been powered off for a particular period of time that does not exceed the threshold; and
reset the previous temperature offset to zero if the controller has been powered off for the period of time that exceeds the threshold.

10. A controller for an HVAC system, the controller comprising:
a communications interface that receives, from an electronic device located within a building zone, a temperature measured within a housing of the electronic device;
a controller monitor configured to detect wireless activity of a wireless radio inside the housing of the electronic device, the wireless activity generating heat inside the housing and causing the temperature inside the housing to exceed a temperature of the building zone outside the housing and generate an actual wireless data value representing an actual amount of wireless data transmitted by the wireless radio over a time period; and
a temperature compensation module configured to determine a wireless heat rise resulting from the wireless activity as a function of the actual wireless data value, to calculate a temperature offset from the wireless heat rise and a wireless offset, and to determine the temperature of the building zone outside the housing by subtracting the temperature offset from the temperature measured inside the housing.

11. The controller of claim 10, wherein the wireless radio causes the temperature inside the housing to exceed the temperature of the building zone outside the housing by generating the heat as a result of wirelessly communicating through a mesh topology to at least one of a Zigbee coordinator and a Zigbee router.

12. The controller of claim 10, wherein the temperature compensation module determines the wireless heat rise resulting from the wireless activity by:
identifying a maximum wireless data value representing a maximum amount of wireless data capable of being transmitted by the wireless radio over the time period;
dividing the actual wireless data value by the maximum wireless data value to determine a scaled heat rise generated by the wireless radio over a time period; and
multiplying the scaled heat rise by a wireless gain to determine the wireless heat rise.

13. The controller of claim 10, wherein the temperature compensation module is configured to calculate the temperature offset as a function of both the wireless offset and the wireless heat rise resulting from the wireless activity;
wherein the wireless offset represents a baseline amount of heat generated by the wireless radio independent from the wireless heat rise resulting from the wireless activity.

14. The controller of claim 13, wherein:
the temperature compensation module comprises a temperature compensation filter that uses a first order low pass transfer function to calculate the temperature offset; and
the temperature compensation module is further configured to generate an input for the temperature compensation filter by summing at least the wireless offset and the wireless heat rise resulting from the wireless activity.

15. An HVAC controller located within a building zone, the controller comprising:
a housing;
a wireless radio contained within the housing and configured to transmit data via a wireless HVAC network;
a humidity sensor configured to measure relative humidity of the building zone inside the housing;
a temperature sensor configured to measure a temperature of the building zone inside the housing; and
a humidity compensation module configured to calculate a dew point of the building zone inside the housing using the relative humidity measured inside the housing and the temperature measured inside the housing;
wherein the humidity compensation module is configured to determine a relative humidity of the building zone outside the housing using a temperature of the building zone outside the housing and the calculated dew point.

16. The HVAC controller of claim 15, further comprising:
a controller monitor configured to detect wireless activity of the wireless radio, the wireless activity generating heat inside the housing and causing a temperature inside the housing to exceed the temperature of the building zone outside the housing; and
a temperature compensation module configured to determine a wireless heat rise resulting from the wireless activity, to calculate a temperature offset based on the wireless heat rise, and to determine the temperature of the building zone outside the housing by subtracting the temperature offset from the temperature measured inside the housing.

17. The HVAC controller of claim 16, wherein the temperature compensation module is configured to calculate the temperature offset as a function of both a wireless offset and the wireless heat rise resulting from the wireless activity;
wherein the wireless offset represents a baseline amount of heat generated by the wireless radio independent from the wireless heat rise resulting from the wireless activity.

18. The HVAC controller of claim 17, wherein:
the temperature compensation module comprises a temperature compensation filter that uses a first order low pass transfer function to calculate the temperature offset; and
the temperature compensation module is further configured to generate an input for the temperature compensation filter by summing at least the wireless offset and the wireless heat rise resulting from the wireless activity.

19. An HVAC controller located within a building zone, the controller comprising:
a housing;
a wireless radio contained within the housing and configured to transmit data via a wireless HVAC network;
a controller monitor configured to detect wireless activity of the wireless radio, the wireless activity generating heat inside the housing and causing a temperature inside the housing to exceed a temperature of the building zone outside the housing;
a temperature sensor configured to measure the temperature inside the housing; and
a temperature compensation module configured to determine a wireless heat rise resulting from the wireless activity, to calculate a temperature offset based on the wireless heat rise as a function of both a wireless offset and the wireless heat rise resulting from the wireless activity, and to determine the temperature of the building zone outside the housing by subtracting the temperature offset from the temperature measured inside the housing, wherein the wireless offset represents a baseline amount of heat generated by the wireless radio independent from the wireless heat rise resulting from the wireless activity.

20. A controller for a HVAC system, the controller comprising:
a communications interface that receives, from an electronic device located within a building zone, a temperature measured within a housing of the electronic device;
a controller monitor configured to detect wireless activity of a wireless radio inside the housing of the electronic device, the wireless activity generating heat inside the housing and causing the temperature inside the housing to exceed a temperature of the building zone outside the housing; and
a temperature compensation module configured to determine a wireless heat rise resulting from the wireless activity, to calculate a temperature offset from the wireless heat rise and a wireless offset as a function of both the wireless offset and the wireless heat rise resulting from the wireless activity, and to determine the temperature of the building zone outside the housing by subtracting the temperature offset from the temperature measured inside the housing, wherein the wireless offset represents a baseline amount of heat generated by the wireless radio independent from the wireless heat rise resulting from the wireless activity.

21. An HVAC controller located within a building zone, the controller comprising:
a housing;
a wireless radio contained within the housing and configured to transmit data via a wireless HVAC network;
a temperature sensor configured to measure a temperature inside the housing; and
a temperature compensation module configured to determine a temperature of the building zone outside the housing based on a mathematical model and based on a measurement of only one temperature sensor device, wherein the mathematical model is a function of an actual wireless data value representing an actual amount of wireless data transmitted by the wireless radio over a time period, wherein the only one temperature sensor device is the temperature sensor and the measurement is the temperature measured by the temperature sensor.

* * * * *